United States Patent
Wittek et al.

(10) Patent No.: US 7,964,253 B2
(45) Date of Patent: Jun. 21, 2011

(54) LIQUID-CRYSTALLINE MEDIUM AND LIQUID-CRYSTAL DISPLAY

(75) Inventors: Michael Wittek, Darmstadt (DE); Brigitte Schuler, Grossostheim (DE); Lars Lietzau, Darmstadt (DE)

(73) Assignee: Merck Patent Gesellschaft mit beschrankter Haftung, Darmstadt (DE)

(*) Notice: Subject to any disclaimer, the term of this patent is extended or adjusted under 35 U.S.C. 154(b) by 0 days.

(21) Appl. No.: 12/769,339

(22) Filed: Apr. 28, 2010

(65) Prior Publication Data
US 2010/0276635 A1    Nov. 4, 2010

(30) Foreign Application Priority Data
Apr. 30, 2009 (DE) .................. 10 2009 019 604

(51) Int. Cl.
*C09K 19/34* (2006.01)
*C09K 19/30* (2006.01)
*C09K 19/12* (2006.01)

(52) U.S. Cl. .............. 428/1.1; 252/299.61; 252/299.63; 252/299.66

(58) Field of Classification Search ............ 428/1.1; 252/299.61, 299.63, 299.66
See application file for complete search history.

(56) References Cited

U.S. PATENT DOCUMENTS

| | | | | |
|---|---|---|---|---|
| 7,879,413 | B2* | 2/2011 | Haseba et al. | 428/1.1 |
| 7,879,414 | B2* | 2/2011 | Saito et al. | 428/1.1 |
| 2009/0059157 | A1* | 3/2009 | Haseba et al. | 349/182 |
| 2009/0237610 | A1* | 9/2009 | Saito et al. | 349/182 |
| 2010/0127211 | A1* | 5/2010 | Tanaka | 252/299.61 |

FOREIGN PATENT DOCUMENTS

WO    WO 2008105286 A1 * 9/2008

* cited by examiner

*Primary Examiner* — Shean C Wu
(74) *Attorney, Agent, or Firm* — Millen, White, Zelano & Branigan, P.C.

(57) ABSTRACT

Disclosed are dielectrically positive liquid-crystalline media containing a dielectrically positive component, component A, containing one or more dielectrically positive compounds of formula I

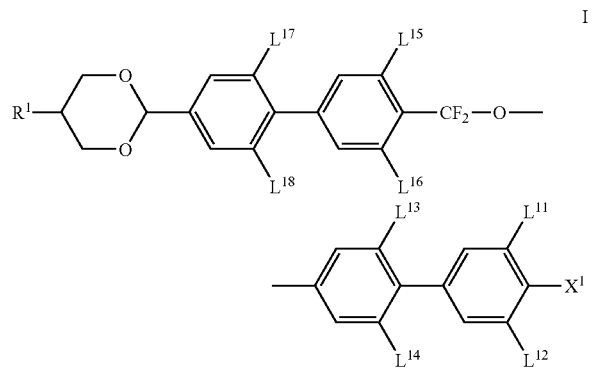

and optionally a second dielectrically positive component, component B, containing one or more dielectrically positive compounds having a dielectric anisotropy of greater than 3, and optionally a dielectrically neutral component, component C, and to liquid-crystal displays, especially active-matrix displays and in particular TN, OCB, IPS and FFS displays, containing these media.

11 Claims, No Drawings

LIQUID-CRYSTALLINE MEDIUM AND LIQUID-CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is essentially perpendicular to the substrates or the liquid-crystal layer. Besides these modes, there are also electro-optical modes that utilise an electric field which is essentially parallel to the substrates or the liquid-crystal layer, such as, for example, the in-plane switching (IPS) mode (as disclosed, for example, in DE 40 00 451 and EP 0 588 568) and the fringe-field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and are intended for use in displays for TV sets and multimedia applications. The liquid crystals in accordance with the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities ($\eta$), especially having lower rotational viscosities ($\gamma_1$), are required. In particular for monitor applications, the rotational viscosity should be 80 mPa·s or less, preferably 60 mPa·s or less and especially 55 mPa·s or less. Besides this parameter, the media must have a nematic phase range of suitable width and position and an appropriate birefringence ($\Delta n$), and the dielectric anisotropy ($\Delta\epsilon$) should be sufficiently high to allow a reasonably low operating voltage. $\Delta\epsilon$ should preferably be greater than 2 and very preferably greater than 3, but preferably not greater than 15 and in particular not greater than 12, as this would prevent an at least fairly high resistivity.

For applications as displays for notebooks or other mobile applications, the rotational viscosity should preferably be 120 mPa·s or less and particularly preferably 100 mPa·s or less. The dielectric anisotropy ($\Delta\epsilon$) here should preferably be greater than 8 and particularly preferably greater than 12.

The displays in accordance with the present invention are preferably addressed by an active matrix (active-matrix LCDs, AMDs for short), preferably by a matrix of thin-film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 029, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes in accordance with the present invention preferably use an electric field which is essentially parallel to the composite layer.

Liquid-crystal compositions which are suitable for LCDs and especially for IPS displays are known, for example, from JP 07-181 439 (A), EP 0.0 667 555, EP 0 673 986, DE 195 09 410, DE 195 28 106, DE 195 28 107, WO 96/23 851 and WO 96/28 521.

Liquid-crystal compositions which comprise compounds of the formula

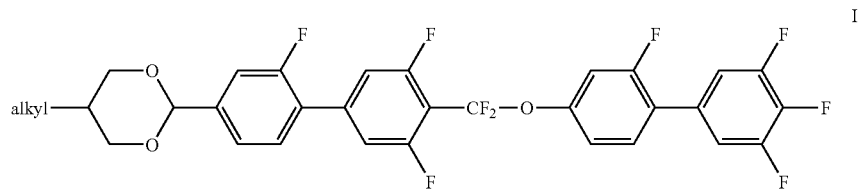

I are mentioned alongside others in WO 2008/105286, but they have no particularly favourable properties for practical industrial applications. The compounds disclosed in WO 2008/105286 are incorporated herein by reference.

These known compositions are afflicted with severe disadvantages. Due to their relatively high viscosities, in particular rotational viscosities ($\gamma_1$), amongst other deficiencies, most of them result in disadvantageously long addressing times, have inadequate values of the resistivity and/or require excessively high operating voltages. In addition, there is a demand for improving the low-temperature behaviour of LCDs. Both an improvement in the operating properties and also in the shelf life or storage stability at low temperatures are necessary here.

Thus, there is a considerable need for liquid-crystalline media having suitable properties for practical applications, such as a broad nematic phase range, suitable optical anisotropy $\Delta n$ corresponding to the display type used, a high $\Delta\epsilon$ and particularly low viscosities for particularly short response times.

PRESENT INVENTION

Surprisingly, it has now been found that it is possible to achieve liquid-crystalline media having a suitably high Δ∈, a suitable phase range and Δn which do not exhibit the disadvantages of the materials from the prior art, or at least only do so to a significantly lesser extent.

These improved liquid-crystalline media in accordance with the present application comprise at least the following components:
a first dielectrically positive component, component A, comprising one or more dielectrically positive compounds of the formula I

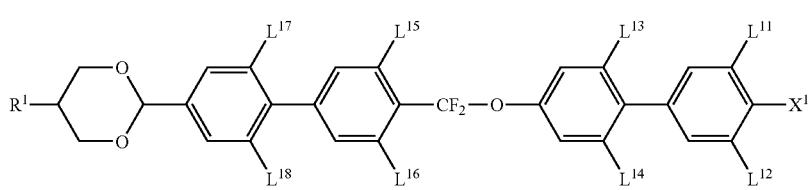

in which
$R^1$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,
$X^1$ denotes F, Cl, fluorinated alkyl or fluorinated alkoxy, each having 1 to 3 C atoms, or fluorinated alkenyl or fluorinated alkenyloxy having 2 to 3 C atoms and preferably F, Cl, —$OCF_3$ or —$CF_3$,
$L^{11}$ to $L^{18}$, independently of one another, denote H, F or Cl, preferably H or F, particularly preferably 4, 5 or 6 of $L^{11}$ to $L^{18}$ denote F and the others denote H, and
optionally, preferably obligatorily, a second dielectrically positive component, component B, comprising one or more dielectrically positive compounds, preferably having a dielectric anisotropy of greater than 3, preferably selected from the group of the compounds of the formulae II and III:

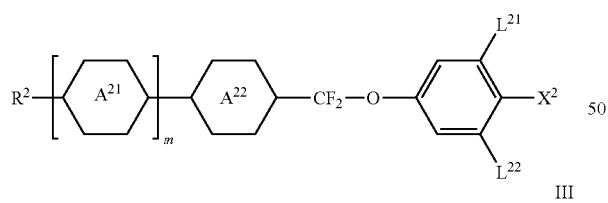

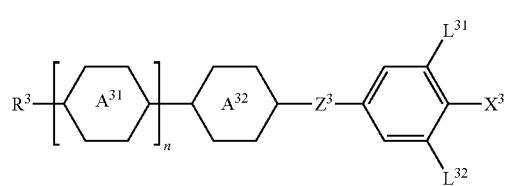

in which
$R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and preferably $R^2$ and $R^3$ denote alkyl or alkenyl,

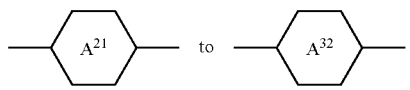

on each appearance, independently of one another, denote

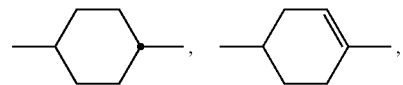

-continued

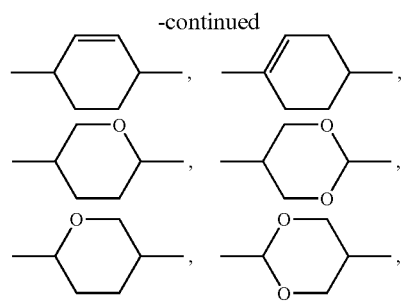

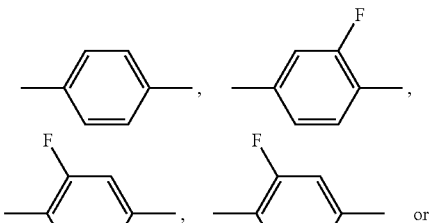

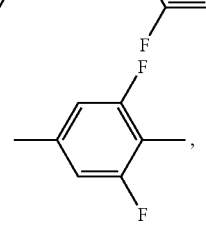

preferably

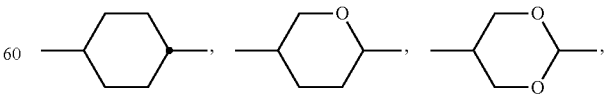

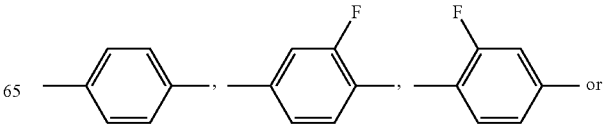

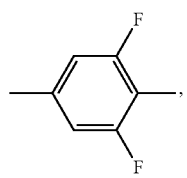

$L^{21}$, $L^{22}$, $L^{31}$ and $L^{32}$, independently of one another, denote H or F, preferably $L^{21}$ and/or $L^{31}$ denote F, $X^2$ and $X^3$, independently of one another, denote halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^3$ denotes —CH$_2$CH$_2$—, —CF$_2$CF$_2$—, —COO—, trans-CH═CH—, trans-CF═CF—, —CH$_2$O— or a single bond, preferably —CH$_2$CH$_2$—, —COO—, trans-CH═CH— or a single bond and very preferably —COO—, trans-CH═CH— or a single bond, and m and n, independently of one another, denote 0, 1, 2 or 3, preferably 1 or 2 and particularly preferably 1, and optionally a dielectrically neutral component, component C, comprising one or more dielectrically neutral compounds of the formula IV

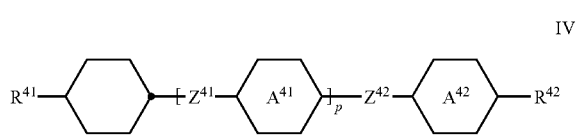

IV in which $R^{41}$ and $R^{42}$, independently of one another, have the meaning indicated above for $R^2$ under formula II, preferably $R^{41}$ denotes alkyl and $R^{42}$ denotes alkyl or alkoxy or $R^{41}$ denotes alkenyl and $R^{42}$ denotes alkyl,

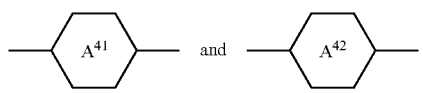

on each occurrence, independently of one another, denote

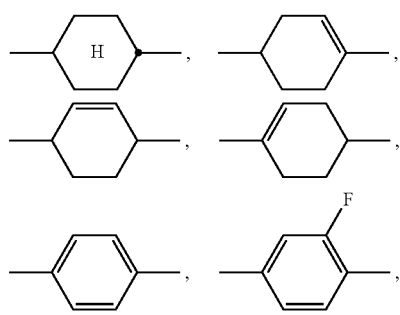

preferably one or more of

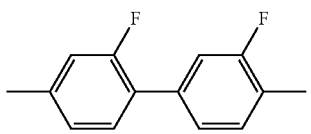

denotes or denote

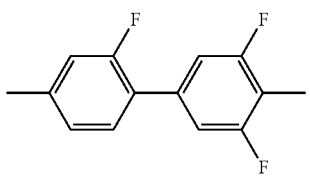

$Z^{41}$ and $Z^{42}$ on each occurrence, independently of one another, denote —CH$_2$CH$_2$—, —COO—, trans-CH═CH—, trans-CF═CF—, —CH$_2$O—, —CF$_2$O—, —C≡C— or a single bond, preferably one or more thereof denotes or denote a single bond, and p denotes 0, 1 or 2, preferably 0 or 1.

Component A preferably comprises, more preferably predominantly consists of, even more preferably essentially consists of and very preferably completely consists of one or more dielectrically positive compounds of the formula I having a dielectric anisotropy of greater than 3.

Particularly preferred compounds of the formula I are compounds which contain one or two groups, preferably two groups, selected from the group of the sub-formulae Ia to Id, preferably selected from the group of the sub-formulae Ia to Ic, particularly preferably of the sub-formula Ib:

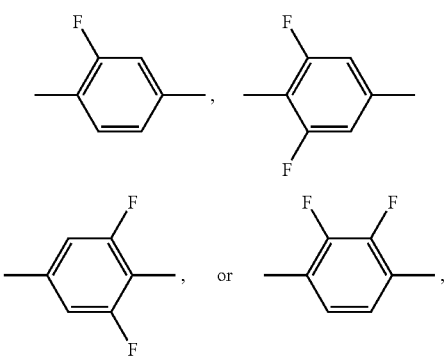

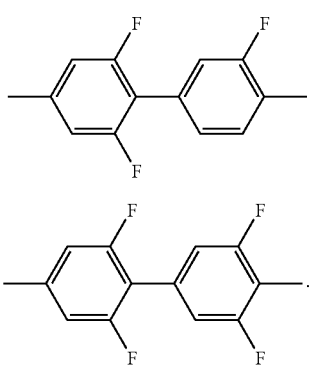

The liquid-crystalline media in accordance with the present application preferably comprise in total 1 to 30%, preferably 2 to 20%, of compounds of the formula I.

The individual compounds are employed in a concentration of 1 to 20%, preferably 1 to 15%. These limits apply, in particular, if in each case two or more homologous compounds, i.e. compounds of the same formula, are employed. If only a single substance, i.e. only one homologue, of the compounds of a formula is employed, its concentration can be in the range from 2 to 20%, preferably from 3 to 6%.

In a preferred embodiment of the present invention, component A comprises, more preferably predominantly consists of, even more preferably essentially consists of and very preferably completely consists of in each case one or more dielectrically positive compounds having a dielectric anisotropy of greater than 3, selected from the group of the compounds of the formulae I-1 to I-4, preferably of the formulae I-2 to I-4 and very particularly preferably of the formula I-4:

in which the parameters have the respective meanings indicated above, and $X^1$ preferably denotes F or $OCF_3$. $X^1$ particularly preferably denotes $OCF_3$ in formula I-1 and F in formula I-4.

In a preferred embodiment of the present invention, component A comprises one or more dielectrically positive compounds having a dielectric anisotropy of greater than 3, of the formula I-4.

The media in accordance with the present invention preferably comprise a second dielectrically positive component, component B. This second dielectrically positive component, component B, preferably comprises, more preferably predominantly consists of, even more preferably essentially consists of and very preferably completely consists of dielectrically positive compounds having a dielectric anisotropy of greater than 3.

This component, component B, preferably comprises, more preferably predominantly consists of, even more preferably essentially consists of and very preferably completely consists of one or more dielectrically positive compounds having a dielectric anisotropy of greater than 3, selected from the group of the formulae II and III.

In a preferred embodiment of the present invention, component B comprises one or more dielectrically positive compounds having a dielectric anisotropy of greater than 3, selected from the group of the compounds of the formulae II-1 to II-4, preferably of the formulae II-1 and/or II-2:

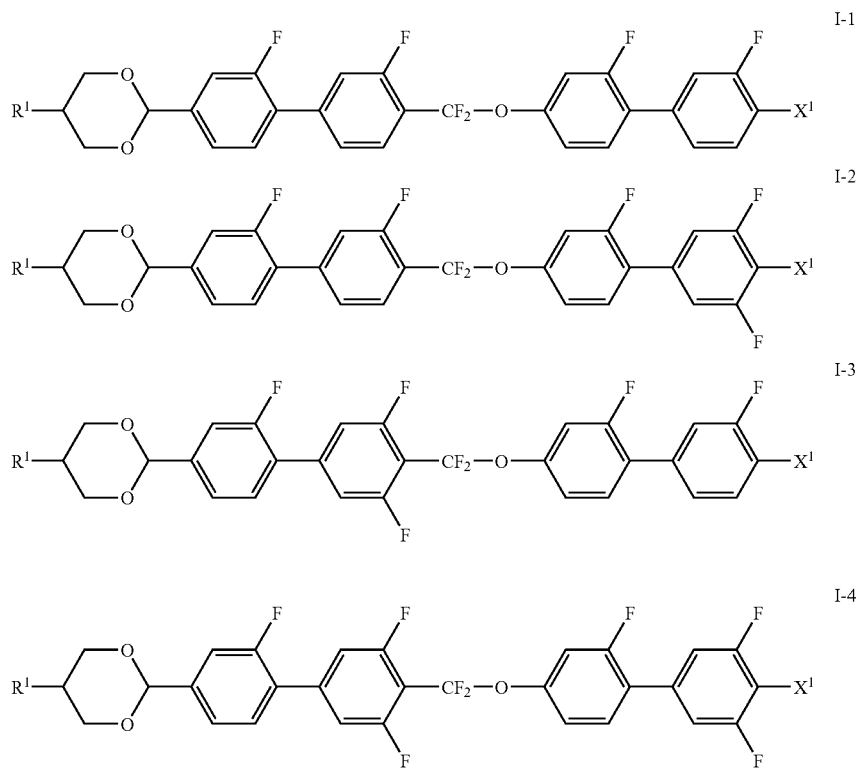

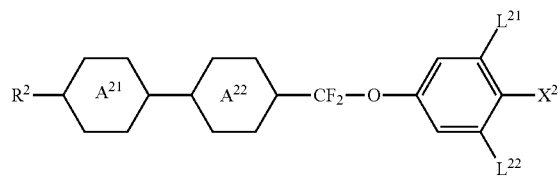
II-1

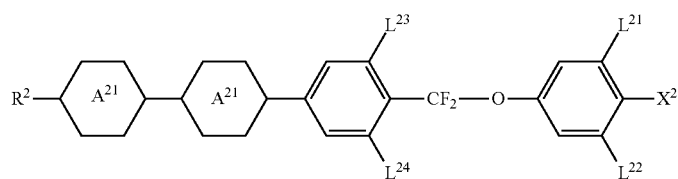
II-2

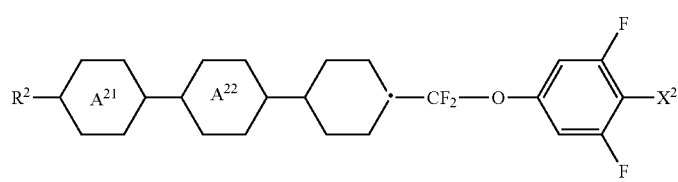
II-3

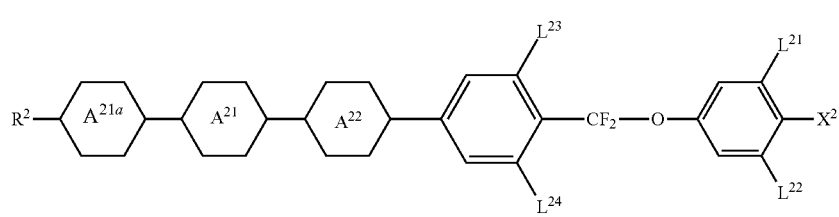
II-4 in which the parameters have the respective meanings indicated, above under formula II, and $L^{23}$ and $L^{24}$, independently of one another, denote H or F, $L^{23}$ preferably denotes F, and

has one of the meanings given for

and in formulae II-1 and II-4 $X^2$ preferably denotes F or $OCF_3$, particularly preferably F, and in formula II-3

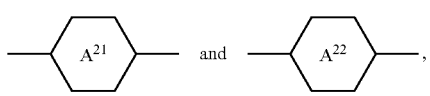 and , independently of one another, preferably denote

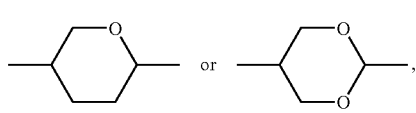

and/or selected from the group of the compounds of the formulae III-1 and III-2:

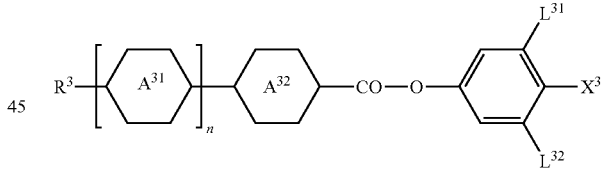
III-1

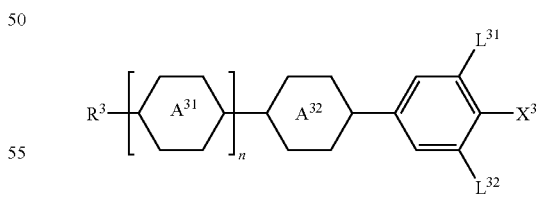
III-2 in which the parameters have the respective meanings indicated under formula III.

and the media in accordance with the present invention, alternatively or in addition to the compounds of the formulae III-1 and/or III-2, comprise one or more compounds of the formula III-3

III-3

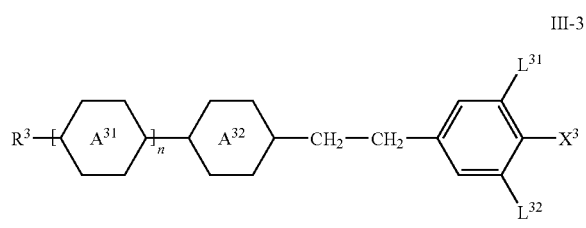

in which the parameters have the respective meanings indicated above.

Component B preferably predominantly consists of, more preferably essentially consists of and very preferably completely consists of the said compounds.

Component B preferably comprises compounds which are selected from the group of the compounds of the formulae II-1 to II-4 in which $L^{21}$ and $L^{22}$ and/or $L^{23}$ and $L^{24}$ both denote F.

In a preferred embodiment, component B comprises compounds which are selected from the group of the compounds of the formulae II-2 and II-3 in which $L^{21}$, $L^{22}$, $L^{23}$ and $L^{24}$ all denote F.

Component B preferably comprises one or more compounds of the formula II-1. The compounds of the formula II-1 are preferably selected from the group of the compounds of the formulae II-1a to II-1e:

II-1a

II-1b

II-1c

II-1d

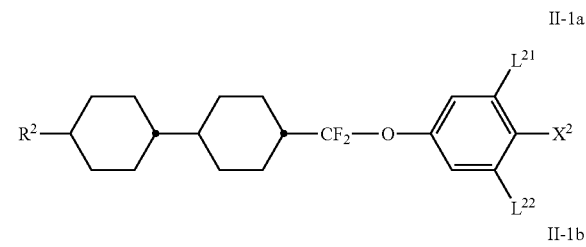

-continued

II-1e

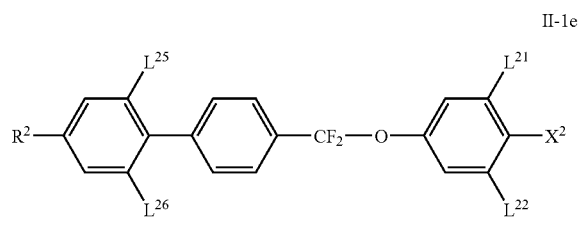

in which the parameters have the respective meanings indicated above, and $L^{25}$ and $L^{26}$, independently of one another and of the other parameters, denote H or F, and preferably in the formulae II-1a and II-1b $L^{21}$ and $L^{22}$ both denote F, in the formulae II-1c and II-1d $L^{21}$ and $L^{22}$ both denote F and/or $L^{23}$ and $L^{24}$ both denote F, and in formula II-1e $L^{21}$, $L^{22}$ and $L^{23}$ denote F.

Component B preferably comprises compounds which are selected from the group of the compounds of the formulae II-1a to II-1e in which $L^{21}$ and $L^{22}$ both denote F and/or $L^{23}$ and $L^{24}$ both denote F.

In a preferred embodiment, component B comprises compounds which are selected from the group of the compounds of the formulae II-1a to II-1e in which $L^{21}$, $L^{22}$, $L^{23}$ and $L^{24}$ all denote F.

Especially preferred compounds of the formula II-1 are

II-1a-1

II-1a-2

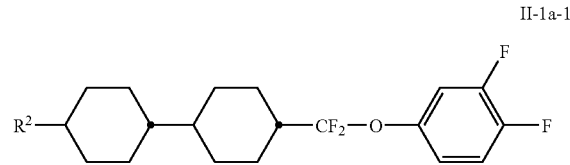

II-1b-1

II-1c-1

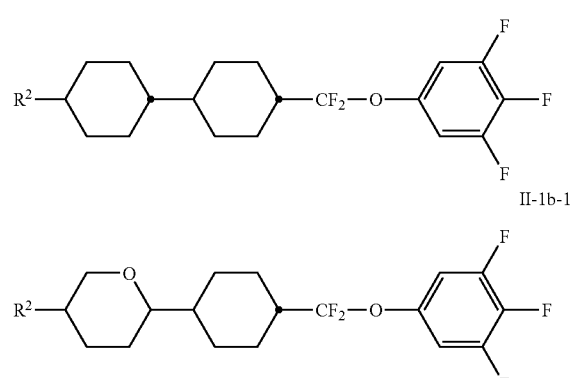

II-1e-2

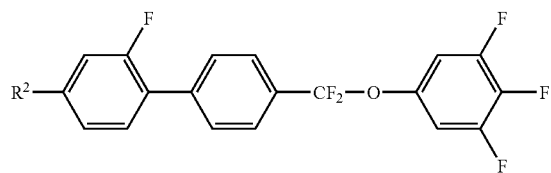

in which R² has the meaning indicated above.

Component B preferably comprises one or more compounds of the formula II-2, which are preferably selected from the group of the compounds of the formulae II-2a to II-2j:

II-2a
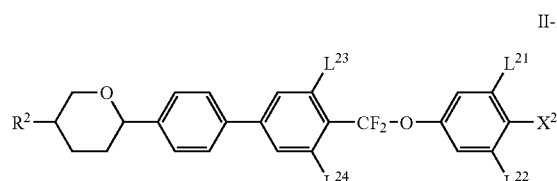

II-2b
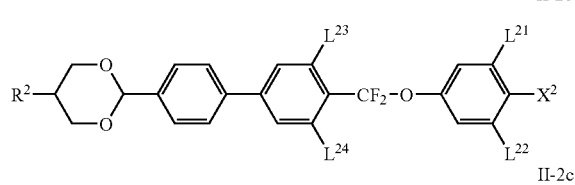

II-2c
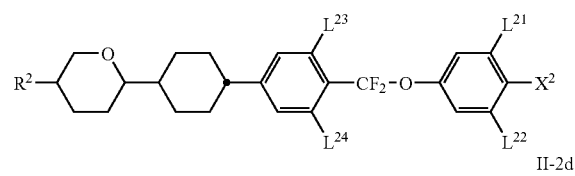

II-2d
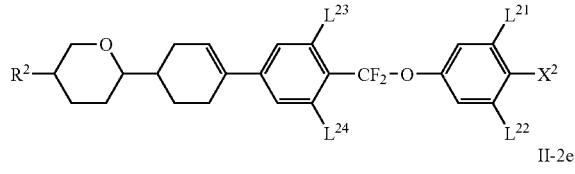

II-2e
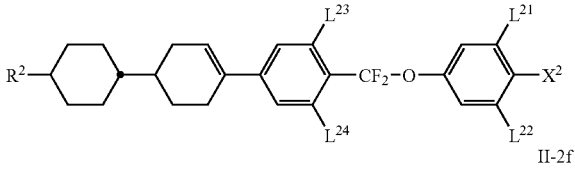

II-2f
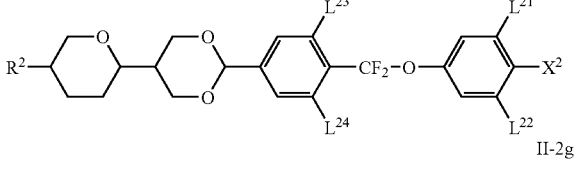

II-2g
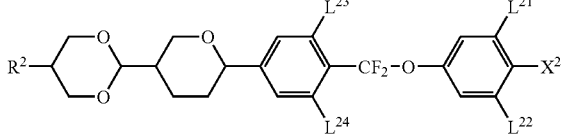

II-2h

II-2i
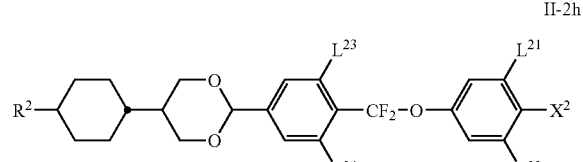

II-2j
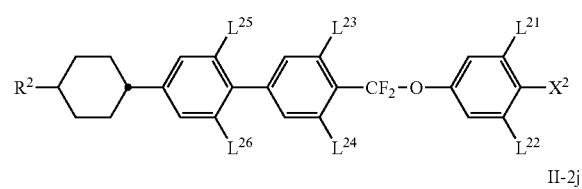

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H.

Component B preferably comprises compounds which are selected from the group of the compounds of the formulae II-2a to II-2i in which $L^{21}$ and $L^{22}$ both denote F and/or $L^{23}$ and $L^{24}$ both denote F.

In a preferred embodiment, component B comprises compounds which are selected from the group of the compounds of the formulae II-2a to II-2i in which $L^{21}$, $L^{22}$, $L^{23}$ and $L^{24}$ all denote F.

Especially preferred compounds of the formula II-2 are the compounds of the following formulae:

II-2a-1
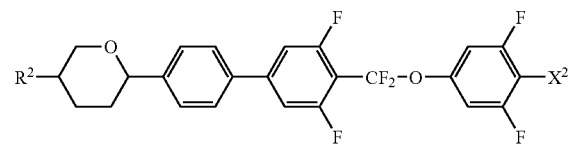

II-2c-1
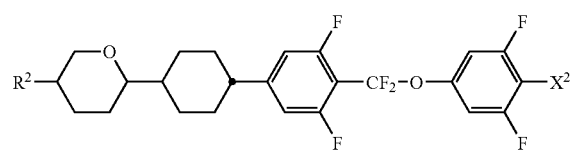

II-2d-1
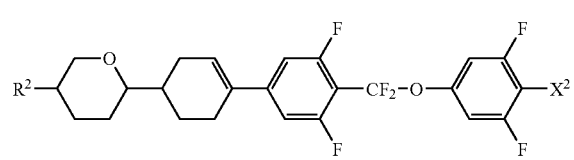

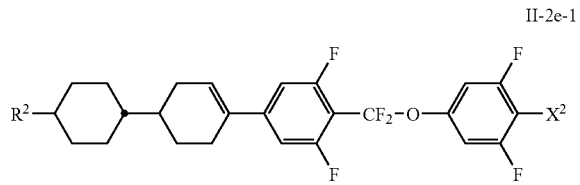
II-2e-1

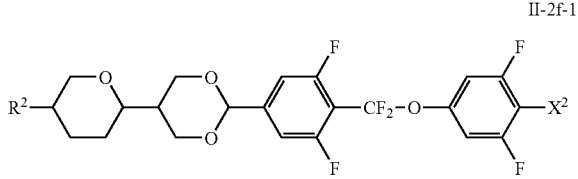
II-2f-1

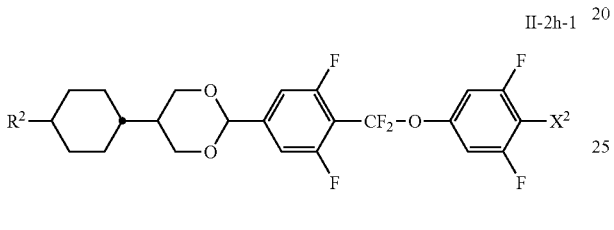
II-2h-1

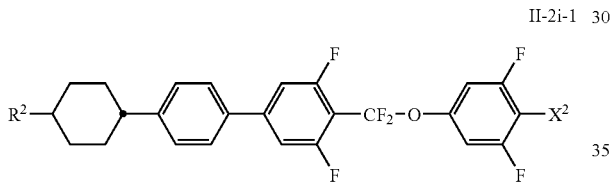
II-2i-1

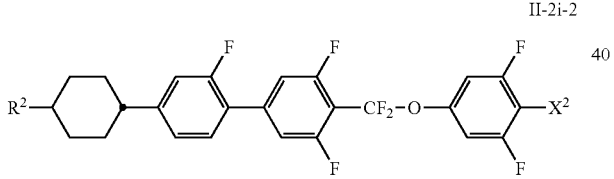
II-2i-2

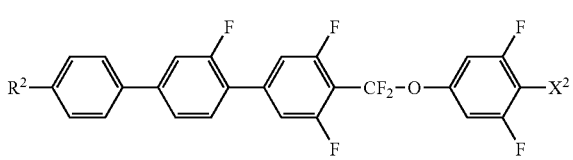
II-2j-1

II-2j-2

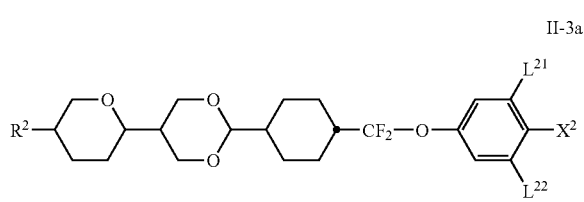

in which $R^2$ and $X^2$ have the respective meanings indicated above, and $X^2$ preferably denotes F.

Component B preferably comprises one or more compounds of the formula II-3. These compounds of the formula II-3 are preferably selected from the group of the compounds of the formulae II-3a to II-3c:

II-3a

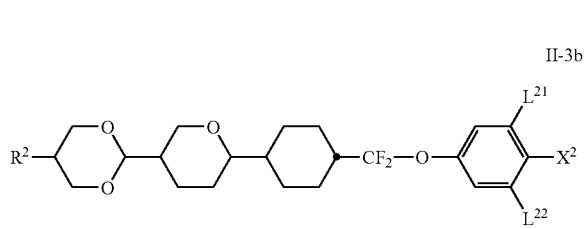

II-3b

II-3c

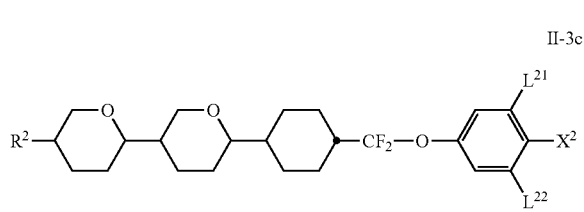

in which the parameters have the respective meanings indicated above, and $L^{21}$ and $L^{22}$ preferably both denote F.

In a preferred embodiment, component B comprises one or more compounds of the formula II-4, preferably of the formula II-4a, II-4a

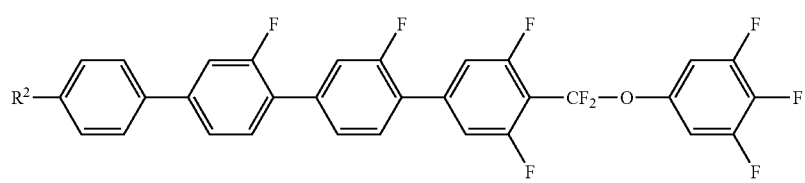

in which the parameters have the respective meanings indicated above, and $X^2$ preferably denotes F or $OCF_3$, particularly preferably F.

Component B preferably comprises one or more compounds of the formula III-1, preferably selected from the group of the compounds of the formulae III-1a and III-1b:

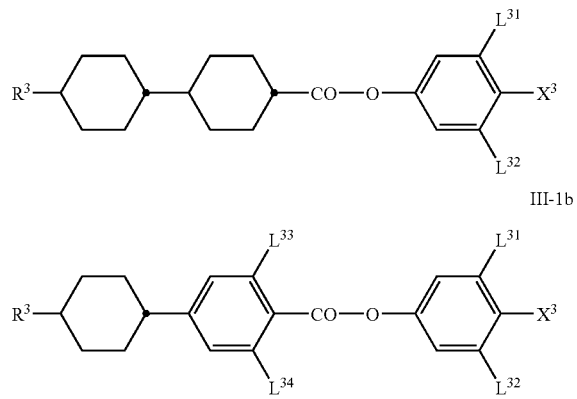

III-1a

III-1b in which the parameters have the respective meanings indicated above, and the parameters $L^{33}$ and $L^{34}$, independently of one another and of the other parameters, denote H or F.

Component B preferably comprises one or more compounds of the formula preferably selected from the group of the compounds of the formulae III-1a-1 to III-1a-6:

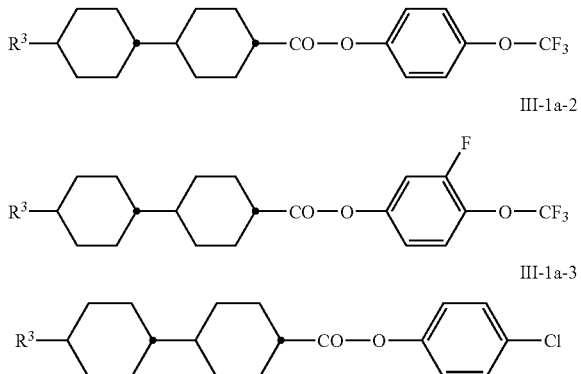

III-1a-1

III-1a-2

III-1a-3

III-1a-4

III-1a-5

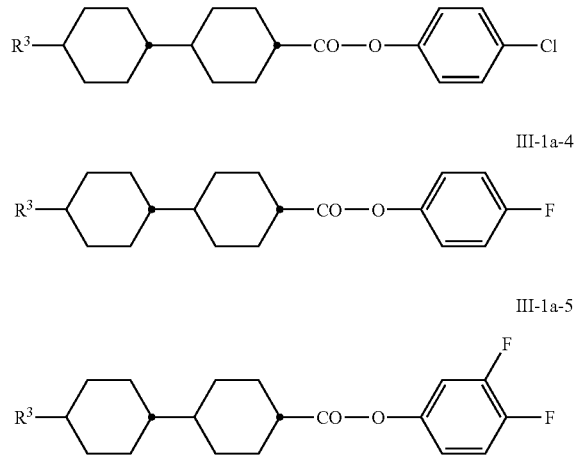

III-1a-6

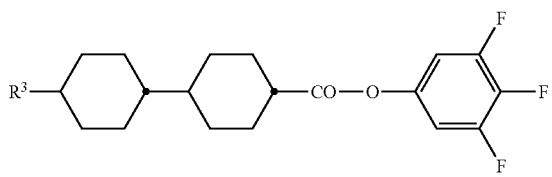

in which $R^3$ has the meaning indicated above.

Component B preferably comprises one or more compounds of the formula III-1b, preferably selected from the group of the compounds of the formulae III-1b-1 to III-1b-4, preferably of the formula III-1b-4:

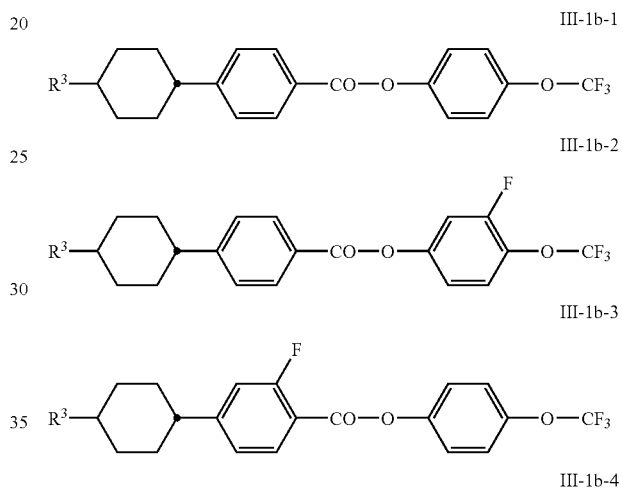

III-1b-1

III-1b-2

III-1b-3

III-1b-4 in which $R^3$ has the meaning indicated above.

Component B preferably comprises one or more compounds of the formula III-2, preferably selected from the group of the compounds of the formulae III-2a to III-2j:

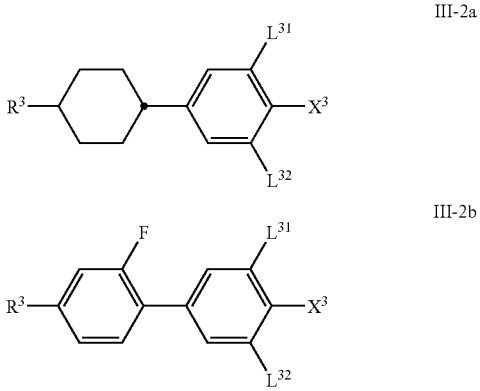

III-2a

III-2b

-continued

III-2c, III-2d, III-2e, III-2f, III-2g, III-2h, III-2i, III-2j (structural formulae with R³, X³, and L³¹, L³², L³³, L³⁴, L³⁵, L³⁶ substituents)

in which the parameters have the respective meanings indicated above, and the parameters $L^{35}$ and $L^{36}$, independently of one another and of the other parameters, denote H or F.

Component B preferably comprises one or more compounds of the formula III-2a, preferably selected from the group of the compounds of the formulae III-2a-1 to III-2a-5:

III-2a-1, III-2a-2, III-2a-3, III-2a-4, III-2a-5 (structural formulae)

in which $R^3$ has the meaning indicated above.

Component B preferably comprises one or more compounds of the formula III-2b, preferably selected from the group of the compounds of the formulae III-2b-1 and III-2b-2, preferably III-2b-2:

III-2b-1, III-2b-2 (structural formulae)

in which $R^3$ has the meaning indicated above.

Component B preferably comprises one or more compounds of the formula III-2c, preferably selected from the group of the compounds of the formulae III-2c-1 to III-2c-5:

III-2c-1 (structural formula)

III-2c-2

III-2c-3

III-2c-4

III-2c-5

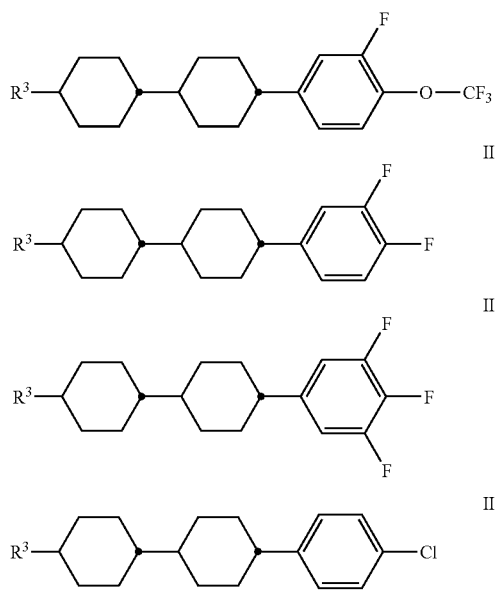

in which R³ has the meaning indicated above.

Component B preferably comprises one or more compounds selected from the group of the compounds of the formulae III-2d and III-2e, preferably III-2e-1:

III-2d-1

III-2e-1

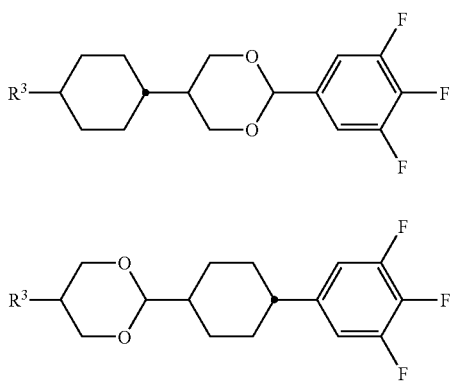

in which R³ has the meaning indicated above.

Component B preferably comprises one or more compounds of the formula III-2f, preferably selected from the group of the compounds of the formulae III-2f-1 to III-2f-5:

III-2f-1

III-2f-2

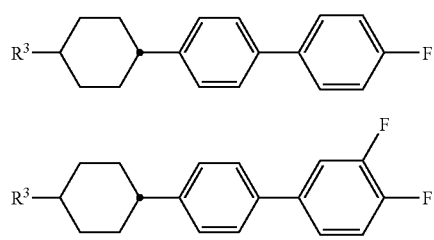

III-2f-3

III-2f-4

III-2f-5

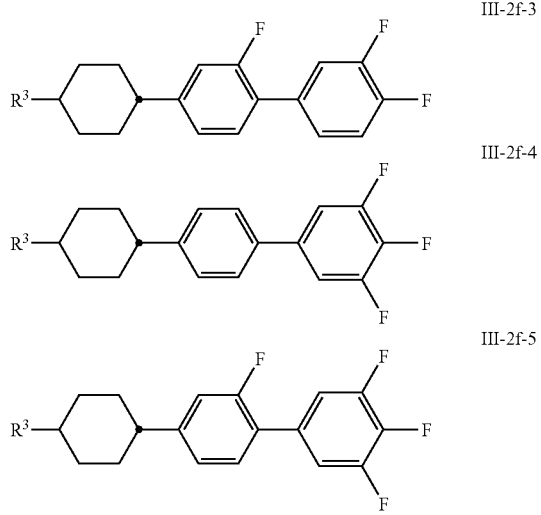

in which R³ has the meaning indicated above.

Component B preferably comprises one or more compounds of the formula III-2g, preferably selected from the group of the compounds of the formulae III-2g-1 to III-2g-5:

III-2g-1

III-2g-2

III-2g-3

III-2g-4

III-2g-5

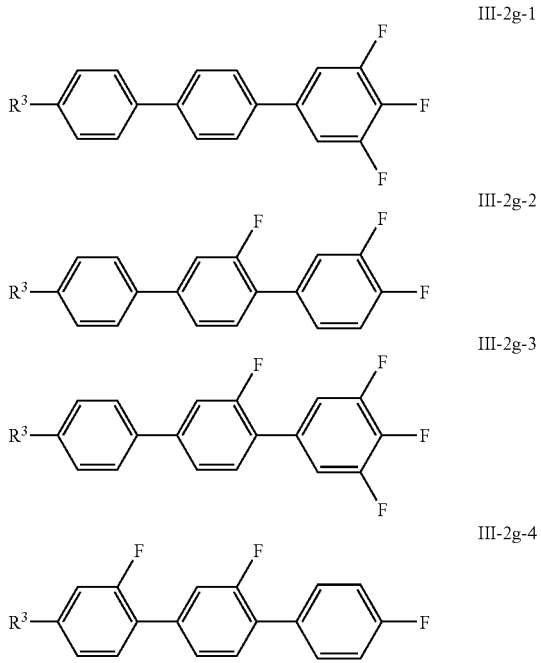

in which R³ has the meaning indicated above.

Component B preferably comprises one or more compounds of the formula III-2h, preferably selected from the group of the compounds of the formulae III-2h-1 to III-2h-3, preferably of the formula III-2h-3:

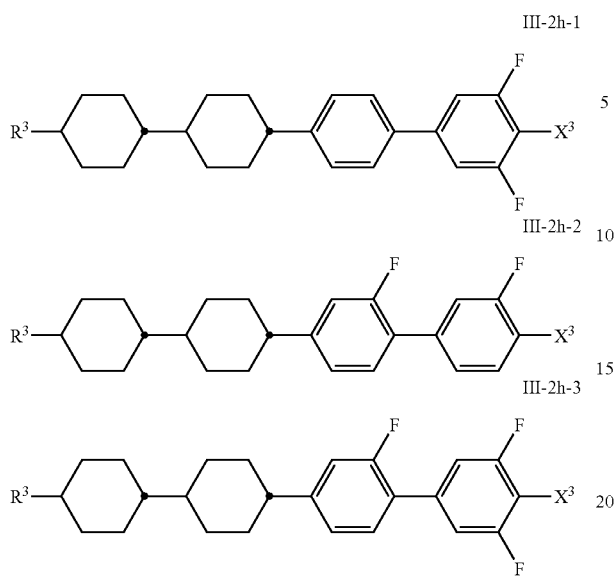

III-2h-1

III-2h-2

III-2h-3 in which the parameters have the respective meanings indicated above, and $X^3$ preferably denotes F.

Component B preferably comprises one or more compounds of the formula III-2, preferably selected from the group of the compounds of the formulae III-2i-1 and III-2i-2, preferably of the formula III-2i-2:

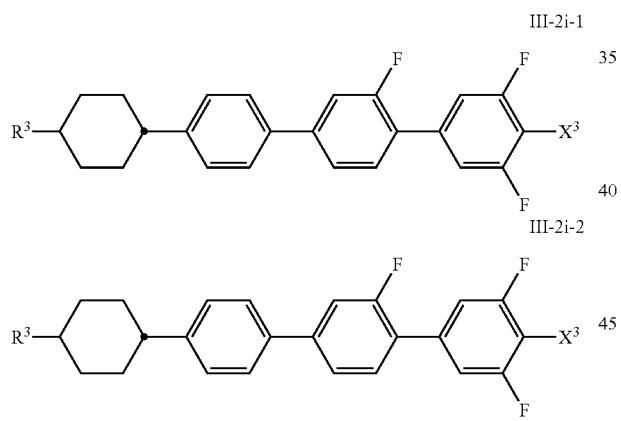

III-2i-1

III-2i-2 in which the parameters have the respective meanings indicated above, and $X^3$ preferably denotes F.

Component B preferably comprises one or more compounds of the formula III-2j, preferably selected from the group of the compounds of the formulae III-2j-1 and III-2j-2, preferably of the formula III-2j-1:

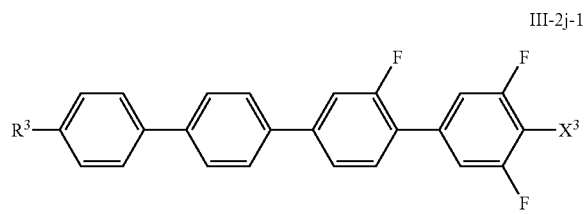

III-2j-1

III-2j-2 in which the parameters have the respective meanings indicated above.

Alternatively or in addition to the compounds of the formulae III-1 and/or III-2, the media in accordance with the present invention may comprise one or more compounds of the formula III-3

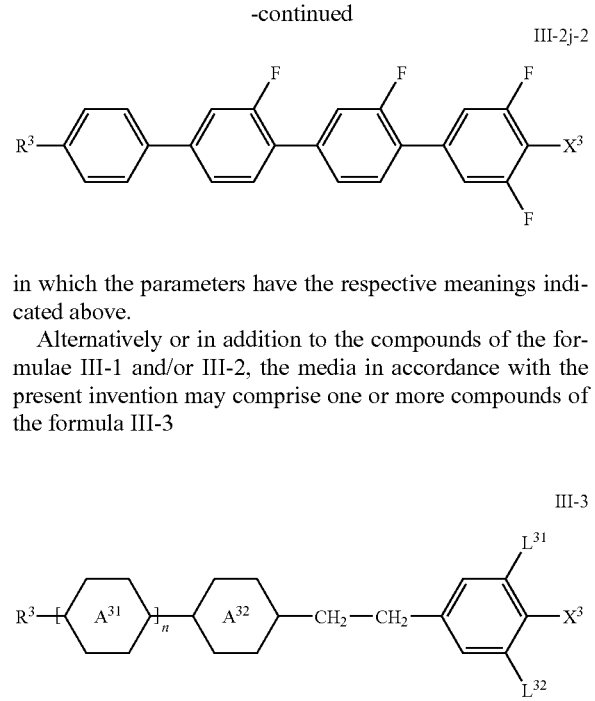

III-3 in which the parameters have the respective meanings indicated above under formula III.

These compounds are preferably selected from the group of the formulae III-3a and III-3b:

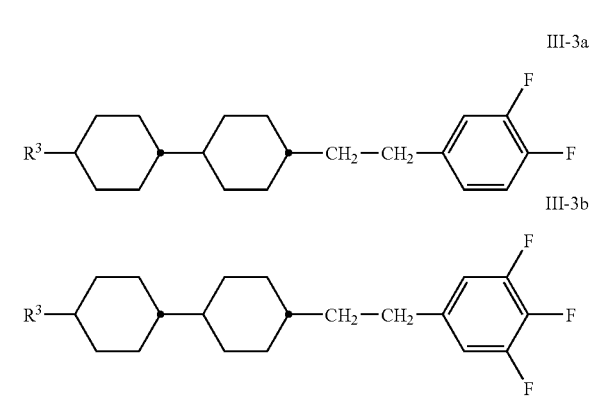

III-3a

III-3b in which $R^3$ has the meaning indicated above.

The liquid-crystalline media in accordance with the present invention preferably comprise a dielectrically neutral component, component C. This component has a dielectric anisotropy in the range from −1.5 to 3. It preferably comprises, more preferably predominantly consists of, even more preferably essentially consists of and especially preferably completely consists of dielectrically neutral compounds having a dielectric anisotropy in the range from −1.5 to 3. This component comprises, more preferably predominantly consists of, even more preferably essentially consists of and very preferably completely consists of one or more dielectrically neutral compounds of the formula IV having a dielectric anisotropy in the range from −1.5 to 3.

The dielectrically neutral component, component C, preferably comprises one or more compounds selected from the group of the compounds of the formulae IV-1 to IV-6:

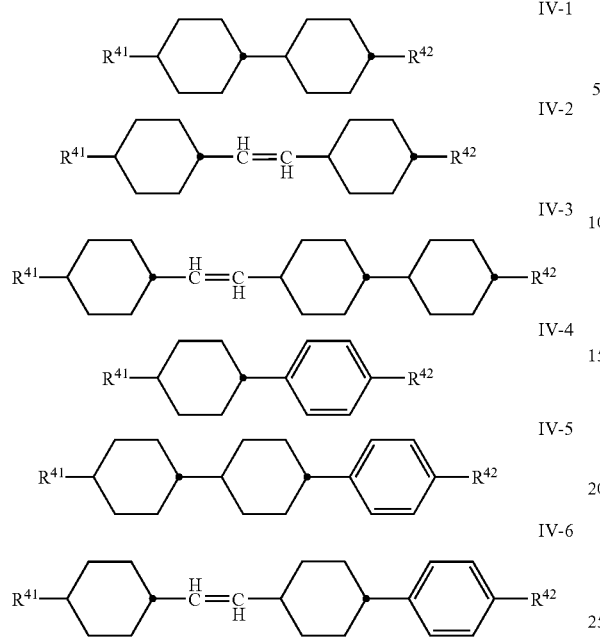

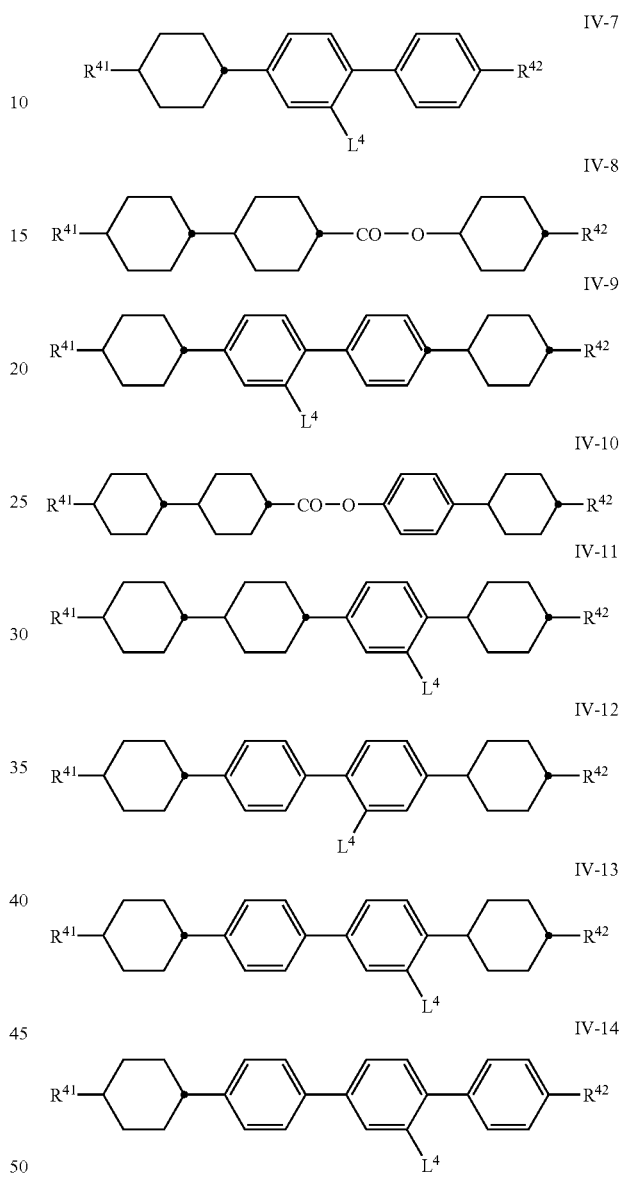

in which $R^{41}$ and $R^{42}$ have the respective meanings indicated above under formula IV, and in the formulae IV-1, IV-5 and IV-6 $R^{41}$ preferably denotes alkyl or alkenyl, preferably alkenyl, and $R^{42}$ preferably denotes alkyl or alkenyl, preferably alkyl, in formula IV-2 $R^{41}$ and $R^{42}$ preferably denote alkyl, and in formula IV-4 $R^{41}$ preferably denotes alkyl or alkenyl, more preferably alkyl, and $R^{42}$ preferably denotes alkyl or alkoxy, more preferably alkoxy.

The dielectrically neutral component, component C, preferably comprises one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably one or more compounds of each of the formulae IV-1, IV-4 and IV-5 and very preferably one or more compounds of each of the formulae IV-1, IV-4, IV-5 and IV-6.

In a preferred embodiment, component C preferably comprises one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, component C preferably comprises one or more compounds of the formula IV-1, more preferably selected from the respective sub-formulae thereof of the formulae CC-n-m, CC-n-V, CC-n-Vm, CC-V-V, CC-V-Vn and/or CC-nV-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1, CC-3-V2 and CC-V-V1. The definitions of these abbreviations (acronyms) are likewise indicated below in Table D or are evident from Tables A to C.

In a further preferred embodiment of the present invention, which may be the same as the previous one or a different one, the liquid-crystal mixtures in accordance with the present invention comprise component C which comprises, preferably predominantly consists of and very preferably completely consists of compounds of the formula IV selected from the group of the compounds of the formulae IV-1 to IV-6 as shown above and optionally of the formulae IV-7 to IV-14:

in which $R^{41}$ and $R^{42}$ independently of one another, denote alkyl, alkoxy, fluorinated alkyl or fluorinated alkoxy having to 7 C atoms, alkenyl, alkenyloxy, alkoxyalkyl or fluorinated alkenyl having 2 to 7 C atoms, and $L^4$ denotes H or F.

In a preferred embodiment, component C preferably comprises one or more compounds of the formula IV-7, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

Alternatively or in addition to the compounds of the formulae II and/or III, the media in accordance with the present invention may comprise one or more dielectrically positive compounds of the formula V

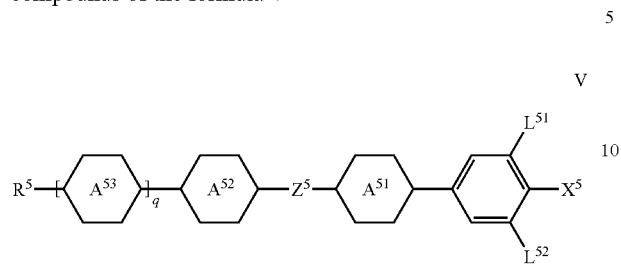

V in which
R⁵ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

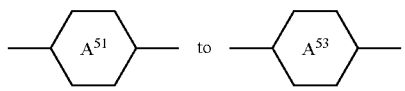

on each occurrence, independently of one another, denote

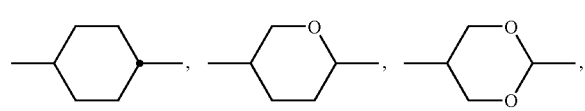

$L^{51}$ and $L^{52}$ independently of one another, denote H or F, preferably $L^{51}$ denotes F, and $X^5$ denotes halogen, halogenated alkyl or alkoxy having 1 to 3 C atoms or halogenated alkenyl or alkenyloxy having 2 or 3 C atoms, preferably F, Cl, —OCF₃ or —CF₃, very preferably F, Cl or —OCF₃, $Z^5$ denotes —CH₂CH₂—, —CF₂CF₂—, —COO—, trans-CH=CH—, trans-CF=CF—, —CH₂O— or —CF₂O, preferably —CH₂CH₂—, —COO— or trans-CH=CH— and very preferably —COO— or trans-CH=CH—, and q denotes 0 or 1.

The media in accordance with the present invention preferably comprise one or more compounds of the formula V, preferably selected from the group of the compounds of the formulae V-1 and V-2:

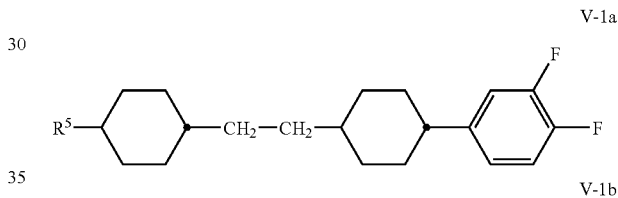

V-1

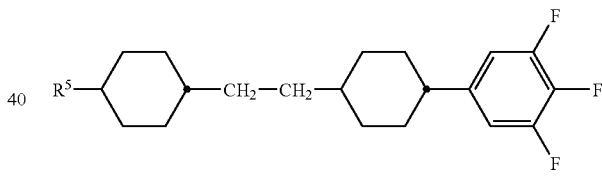

V-2 in which the parameters have the respective meanings indicated above, and the parameters $L^{53}$ and $L^{54}$, independently of one another and of the other parameters, denote H or F, and $Z^5$ preferably denotes —CH₂—CH₂—.

The compounds of the formula V-1 are preferably selected from the group of the compounds of the formulae V-1a and V-1 b:

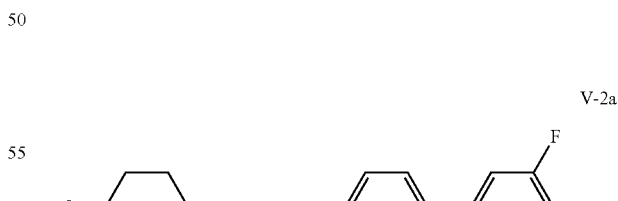

V-1a

V-1b in which R⁵ has the meaning indicated above.

The compounds of the formula V-2 are preferably selected from the group of the compounds of the formulae V-2a to V-2d:

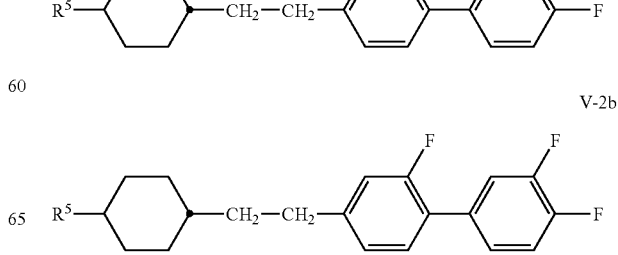

V-2a

V-2b

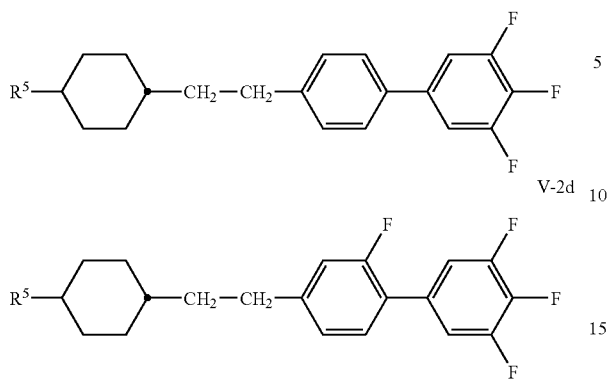

in which $R^5$ has the meaning indicated above.

The liquid-crystalline media in accordance with the present invention preferably comprise an additional dielectrically neutral component, component D. This component has a dielectric anisotropy in the range from −1.5 to 3. It preferably comprises, more preferably predominantly consists of, even more preferably essentially consists of and especially preferably completely consists of dielectrically neutral compounds having a dielectric anisotropy in the range from −1.5 to 3. This component preferably comprises, more preferably predominantly consists of, even more preferably essentially consists of and very preferably completely consists of one or more dielectrically neutral compounds having a dielectric anisotropy in the range from −1.5 to 3, of the formula VI

in which $R^{61}$ and $R^{62}$ independently of one another, have the meaning indicated above for $R^2$ under formula II, preferably $R^{61}$ denotes alkyl and $R^{62}$ denotes alkyl or alkenyl,

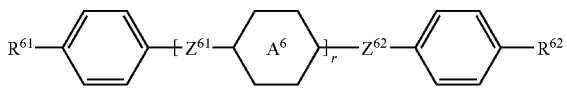

on each occurrence, independently of one another, denotes

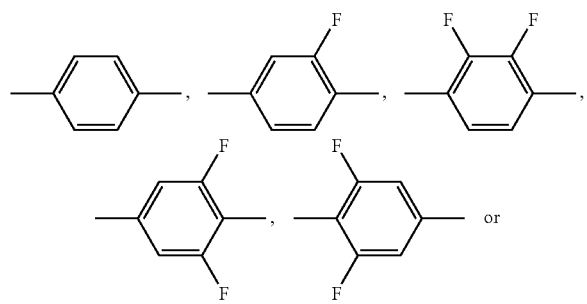

preferably one or more of

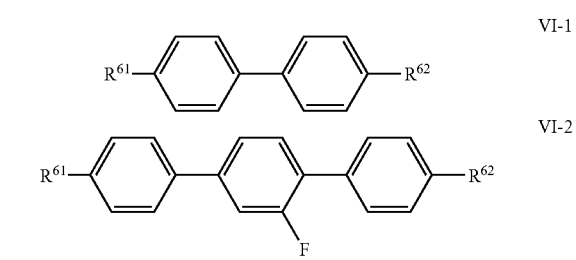

denotes or denote $Z^{61}$ and $Z^{62}$, independently of one another and, if $Z^{61}$ occurs twice, also these independently of one another, denote —CH$_2$CH$_2$—, —COO—, trans-CH=CH—, trans-CF=CF—, —CH$_2$O—, —CF$_2$O— or a single bond, preferably one or more thereof denotes or denote a single bond, and r denotes 0, 1 or 2, preferably 0 or 1, particularly preferably 1.

The dielectrically neutral component, component D, preferably comprises one or more compounds selected from the group of the compounds of the formulae VI-1 and VI-2:

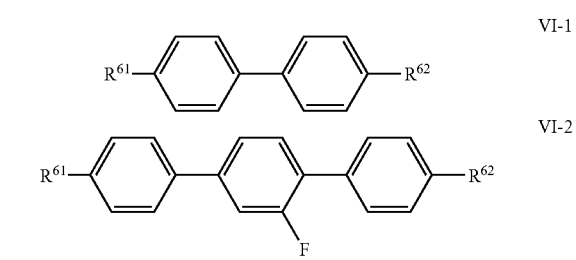

in which $R^{61}$ and $R^{62}$ have the respective meanings indicated above under formula VI, and $R^{61}$ preferably denotes alkyl, and in formula VI-1 $R^{62}$ preferably denotes alkenyl, preferably —(CH$_2$)$_2$—CH=CH—CH$_3$, and in formula VI-2 $R^{62}$ preferably denotes alkyl, —(CH$_2$)$_2$—CH=CH$_2$ or —(CH$_2$)$_2$—CH=CH—CH$_3$.

The dielectrically neutral component, component D, preferably comprises one or more compounds selected from the group of the compounds of the formulae VI-1 and VI-2 in which $R^{61}$ preferably denotes n-alkyl, and in formula VI-1 $R^{62}$ preferably denotes alkenyl, and in formula VI-2 $R^{62}$ preferably denotes n-alkyl.

In a preferred embodiment, component D preferably comprises one or more compounds of the formula VI-1, more preferably of the sub-formula PP-n-2Vm thereof, even more preferably of the formula PP-1-2V1. The definitions of these abbreviations (acronyms) are indicated below in Table D or are evident from Tables A to C.

In a preferred embodiment, component D preferably comprises one or more compounds of the formula VI-2, more preferably of the sub-formulae PGP-n-m, PGP-n-2V and PGP-n-2Vm thereof, even more preferably of the sub-formulae PGP-3-m, PGP-n-2V and PGP-n-V1 thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are likewise indicated below in Table D or are evident from Tables A to C.

Besides components A and B, the liquid-crystal mixtures in accordance with the present invention preferably comprise at least one further component. This third component can be one of components C and D, the third component present is preferably component C.

The mixtures in accordance with the present invention may of course also comprise all four components A, B, C and D.

In addition, the liquid-crystal mixtures in accordance with the present invention may comprise a further optional component, component E, which has negative dielectric anisotropy and comprises, preferably predominantly consists of, more preferably essentially consists of and very preferably completely consists of dielectrically negative compounds, preferably of the formula VII

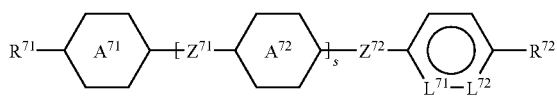

VII in which $R^{71}$ and $R^{72}$, independently of one another, have the meanings indicated above for $R^2$ under formula II,

denotes

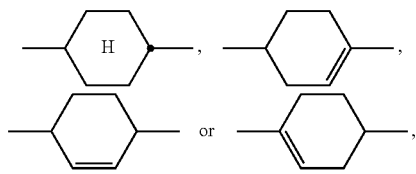

preferably

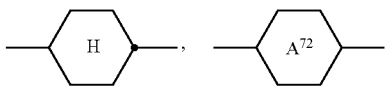

on each occurrence, independently of one another, denotes

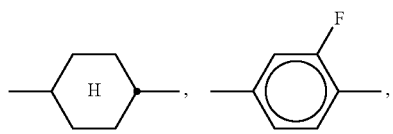

-continued

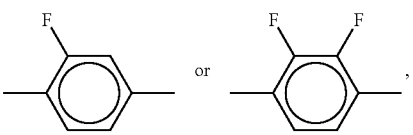

$Z^{71}$ and $Z^{72}$ on each occurrence, independently of one another, denote —CH$_2$CH$_2$—, —COO—, trans-CH=CH—, trans-CF=CF—, —CH$_2$O—, —CF$_2$O— or a single bond, preferably one or more thereof denotes or denote a single bond and very preferably both denote a single bond, $L^{71}$ and $L^{72}$, independently of one another, denote C—F or N, preferably one or more thereof denotes or denote C—F and very preferably both denote C—F, and s denotes 0 or 1.

In addition, the liquid-crystal mixtures in accordance with the present invention may comprise a further optional component, component F, which has positive dielectric anisotropy and comprises, preferably predominantly consists of, more preferably essentially consists of and very preferably completely consists of dielectrically positive compounds, preferably of the formula VIII

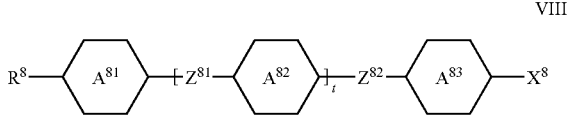

VIII in which $R^8$ has the meaning indicated above for $R^2$ under formula II, one of

to

which is present denotes

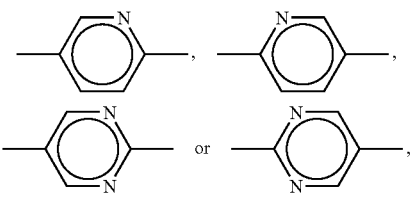

preferably

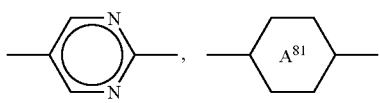

preferably denotes

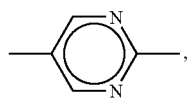

and the others have the same meaning or on each occurrence, independently of one another, denote

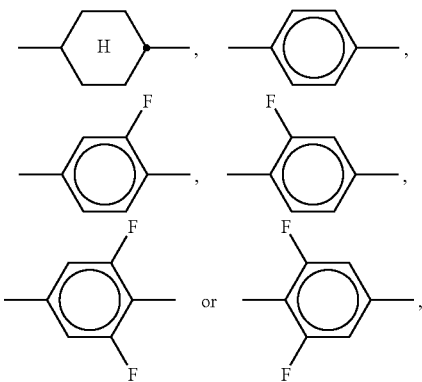

preferably

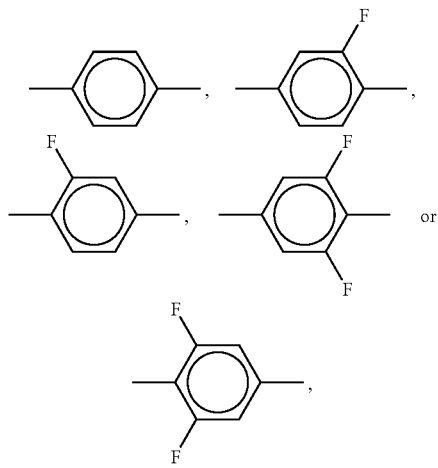

$Z^{81}$ and $Z^{82}$ on each occurrence, independently of one another, denote —CH$_2$CH$_2$—, —COO—, trans-CH=CH—, trans-CF=CF—, —CH$_2$O—, —CF$_2$O— or a single bond, preferably one or more thereof denotes or denote a single bond and very preferably both denote a single bond, t denotes 0, 1 or 2, preferably 0 or 1, more preferably 1, and $X^8$ has the meaning indicated above for $X^2$ under formula II or alternatively, independently of $R^8$, can have the meaning indicated for $R^8$.

The liquid-crystalline media in accordance with the present invention preferably comprise, more preferably predominantly consist of, even more preferably essentially consist of and very preferably completely consist of components A to E, preferably A to D and very preferably A to C, and in particular compounds selected from the group of the compounds of the formulae I to VIII, preferably I to V and very particularly preferably I to III and/or IV.

In this application, comprise in connection with compositions means that the entity in question, i.e. the medium or the component, comprises the component or components or compound or compounds indicated, preferably in a total concentration of 10% or more and very preferably 20% or more.

In this connection, predominantly consist of means that the entity in question comprises 55% or more, preferably 60% or more and very preferably 70% or more of the component or components or compound or compounds indicated.

In this connection, essentially consist of means that the entity in question comprises 80% or more, preferably 90% or more and very preferably 95% or more of the component or components or compound or compounds indicated.

In this connection, completely consist of means that the entity in question comprises 98% or more, preferably 99% or more and very preferably 100.0% of the component or components or compound or compounds indicated.

Component E preferably comprises, more preferably predominantly consists of and very preferably completely consists of one or more compounds of the formula VII, preferably selected from the group of the compounds of the formulae VII-1 to VII-3:

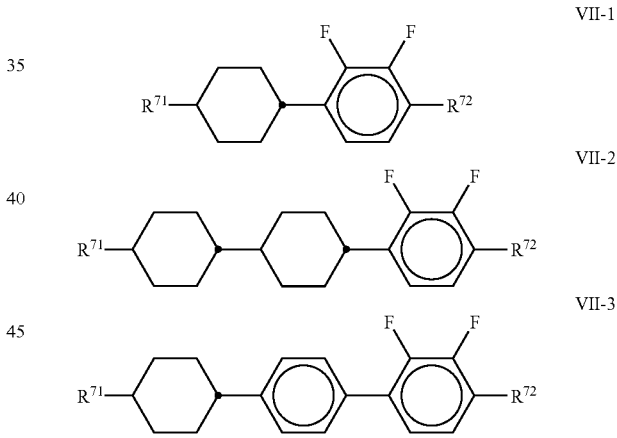

in which $R^{71}$ and $R^{72}$ have the respective meanings indicated above under formula VII.

In the formulae VII-1 to VII-3, $R^{71}$ preferably denotes n-alkyl or 1 E-alkenyl and $R^{72}$ preferably denotes n-alkyl or alkoxy.

Other mesogenic compounds which are not explicitly mentioned above can optionally and advantageously also be used in the media in accordance with the present invention. Such compounds are known to the person skilled in the art.

The liquid-crystal media in accordance with the present invention preferably have a clearing point of 60° C. or more, more preferably 60° C. or more, particularly preferably 70° C. or more and very particularly preferably 75° C. or more.

The nematic phase of the media in accordance with the invention preferably extends at least from 0° C. or less to 70° C. or more, more preferably at least from −20° C. or less to 75° C. or more, very preferably at least from −30° C. or less to 75° C. or more and in particular at least from −40° C. or less to 80° C. or more.

The $\Delta\epsilon$ of the liquid-crystal medium in accordance with the invention, at 1 kHz and 20° C., is preferably 2 or more, more preferably 4 or more and very preferably 6 or more. In particular, $\Delta\epsilon$ is 25 or less and very particularly preferably 20 or less.

The $\Delta n$ of the liquid-crystal media in accordance with the present invention, at 589 nm ($Na^D$) and 20° C., is preferably in the range from 0.070 or more to 0.150 or less, more preferably in the range from 0.080 or more to 0.140 or less, even more preferably in the range from 0.090 or more to 0.135 or less and very particularly preferably in the range from 0.100 or more to 0.130 or less.

In a first preferred embodiment of the present application, the $\Delta n$ of the liquid-crystal media in accordance with the present invention is preferably 0.080 or more, more preferably 0.090 or more.

In this first preferred embodiment of the present invention, the $\Delta n$ of the liquid-crystal media is preferably in the range from 0.090 or more to 0.120 or less, more preferably in the range from 0.095 or more to 0.115 or less and very particularly preferably in the range from 0.100 or more to 0.105 or less, while $\Delta\epsilon$ is preferably in the range from 4 or more to 11 or less, preferably in the range from 5 or more to 9 or less and particularly preferably in the range from 6 or more to 8 or less.

In this embodiment, the nematic phase of the media according to the invention preferably extends at least from −20° C. or less to 70° C. or more, more preferably at least from −30° C. or less to 70° C. or more, very preferably at least from −40° C. or less to 70° C. or more and in particular at least from −40° C. or less to 75° C. or more.

In a second preferred embodiment of the present invention, the $\Delta n$ of the liquid-crystal media is preferably in the range from 0.115 or more to 0.140 or less, more preferably in the range from 0.120 or more to 0.135 or less and very particularly preferably in the range from 0.125 or more to 0.130 or less, while $\Delta\epsilon$ is preferably 6 or more, more preferably 7 or more and very preferably in the range from 8.5 or more to 10 or less.

In this embodiment, the nematic phase of the media according to the invention preferably extends at least from −20° C. or less to 70° C. or more, more preferably at least from −30° C. or less to 70° C. or more, very preferably at least from −40° C. or less to 70° C. or more and in particular at least from −40° C. or less to 75° C. or more.

In a third preferred embodiment of the present invention, the $\Delta n$ of the liquid-crystal media is preferably in the range from 0.115 or more to 0.140 or less, more preferably in the range from 0.120 or more to 0.135 or less and very preferably in the range from 0.125 or more to 0.130 or less, while $\Delta\epsilon$ is preferably 6 or more, more preferably 7 or more and is very preferably in the range from 8.5 or more to 10 or less, the $\Delta n$ of the liquid-crystal media is preferably in the range from 0.070 or more to 0.120 or less, more preferably in the range from 0.075 or more to 0.115 or less and very particularly preferably in the range from 0.080 or more to 0.110 or less, while $\Delta\epsilon$ is preferably 3.5 or more, preferably in the range from 4.0 or more to 7.0 or less, more preferably in the range from 4.5 or more to 6.0 or less and particularly preferably in the range from 5.0 or more to 5.5 or less.

In this embodiment, the nematic phase of the media according to the invention preferably extends at least from −20° C. or less to 75° C. or more, more preferably at least from −30° C. or less to 70° C. or more, very preferably at least from −30° C. or less to 75° C. or more and in particular at least from −30° C. or less to 80° C. or more.

In a fourth preferred embodiment of the present invention, which is particularly suitable for use of the displays in notebooks with 2.5 V drivers or with 3.3 V drivers, the $\Delta n$ of the liquid-crystal media is preferably in the range from 0.090 or more to 0.130 or less, more preferably in the range from 0.100 or more to 0.120 or less and very particularly preferably in the range from 0.110 or more to 0.115 or less, while $\Delta\epsilon$ is preferably 10 or more and, for applications with 2.5 V drivers, is preferably in the range from 15 or more to 22 or less, more preferably in the range from 16 or more to 20 or less and particularly preferably in the range from 17 or more to 19 or less and, for applications with 3.3 V drivers, is preferably in the range from 10 or more to 25 or less, more preferably in the range from 11 or more to 14 or less and particularly preferably in the range from 12 or more to 13 or less.

In this embodiment, the nematic phase of the media according to the invention preferably extends at least from −10° C. or less to 70° C. or more, more preferably at least from −30° C. or less to 75° C. or more and in particular at least from −40° C. or less to 80° C. or more.

In accordance with the present invention, component A is preferably used in a concentration of 1% to 25%, more preferably 1% to 20%, even more preferably 2% to 15% and very preferably 3% to 10% of the mixture as a whole.

Component B is preferably used in a concentration of 45% to 75%, more preferably 40% to 70%, even more preferably 45% to 65% and very preferably 50% to 60% of the mixture as a whole.

Component C is preferably used in a concentration of 20% to 60%, more preferably 25% to 55%, even more preferably 30% to 50% and very preferably 35% to 45% of the mixture as a whole.

Component D is preferably used in a concentration of 0% to 50%, more preferably 1% to 40%, even more preferably 5% to 30% and very preferably 10% to 20% of the mixture as a whole.

Component E is preferably used in a concentration of 0% to 30%, more preferably 0% to 15% and very preferably 0% to 10% of the mixture as a whole.

The media according to the invention may optionally comprise further liquid-crystal compounds in order to adjust the physical properties. Such compounds are known to the person skilled in the art. Their concentration in the media in accordance with the present invention is preferably 0% to 30%, more preferably 0.1% to 20% and very preferably 1% to 15%.

In the first preferred embodiment of the present invention, as mentioned above, component A is preferably used in a concentration of 1% to 15%, more preferably 3% to 10% and very preferably 5% to 7% of the mixture as a whole, while component D is preferably used in a concentration of 5% to 40%, more preferably 10% to 35% and very preferably 10% to 30% of the mixture as a whole.

In this preferred embodiment, the media preferably comprise one or more compounds of the formula VI and very particularly preferably of the formula VI-2.

Especially in the second preferred embodiment of the present invention, as mentioned above, component C preferably comprises one or more compounds of the formula VI, more preferably of the formula VI-1, even more preferably selected from the respective sub-formulae thereof of the formulae CC-n-V and/or CC-n-Vm, more preferably of the formulae CC-n-V1 and/or CC-n-V and very preferably selected from the group of the formulae CC-3-V, CC-4-V, CC-5-V and CC-3-V1. The definitions of these abbreviations (acronyms) are indicated below in Table D In a preferred embodiment, the concentration of the compound of the formula CC-3-V in the media according to the invention can be 50% to 65%, particularly preferably 55% to 60%.

The liquid-crystal media preferably comprise in total 50% to 100%, more preferably 70% to 100% and very preferably 80% to 100% and in particular 90% to 100% of components A, B, C and D, preferably components A, B and C, which in turn comprise, preferably predominantly consist of and very preferably completely consist of one or more of the compounds of the formulae I, II, III, IV, V, VI, VII and VIII, preferably of the formulae I, II, III, IV, V and/or VI and/or VIII, more preferably of the formulae I, II, III, IV and/or VI.

In the present application, the expression dielectrically positive describes compounds or components where $\Delta \in >3.0$, dielectrically neutral describes those where $-1.5 \leq \Delta \in \leq 3.0$ and dielectrically negative describes those where $\Delta \in <-1.5$. $\Delta \in$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta \in$ is defined as $(\in_{\|} - \in_{\perp})$, while $\in_{av.}$ is $(\in_{\|} + 2\in_{\perp})/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta \in$) is determined at a frequency of 1 kHz. The threshold voltages, as well as all other electro-optical properties, are determined using test cells produced at Merck KGaA; Germany. The test cells for the determination of $\Delta \in$ have a cell thickness of approximately 20 µm. The electrode is a circular ITO electrode having an area of 1.13 cm$^2$ and a guard ring. The orientation layers are SE-1211 from Nissan Chemicals, Japan, for homeotropic orientation ($\in_{\|}$) and polyimide AL-1054 from Japan Synthetic Rubber, Japan, for homogeneous orientation ($\in_{\perp}$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Meichers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

By addition of suitable additives, the liquid-crystal media in accordance with the present invention can be modified in such a way that they can be used in all known types of liquid-crystal displays, either using the liquid-crystal media as such, such as TN, TN-AMD, ECB-AMD, VAN-AMD, OCB-AMD, IPS-AMD, FFS-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.
TABLE A
| | Ring elements |
|---|---|
| C |  |
| D |  |
| A | 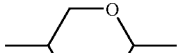 |
| P | 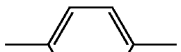 |
| G | 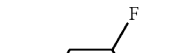 |
| U | 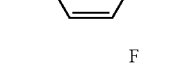 |
| Y |  |
| M |  |
| DI | 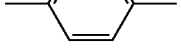 |
| AI | 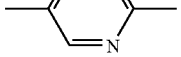 |
| GI |  |
| UI |  |
TABLE A-continued
| | Ring elements |
|---|---|
| MI | 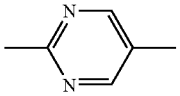 |
| N | 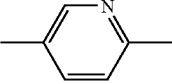 |
| Np | 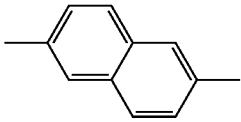 |
| N3f | 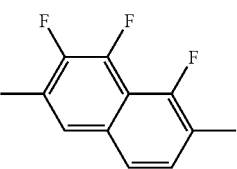 |
| tH | 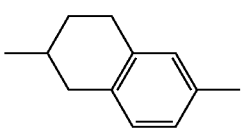 |
| tH2f | 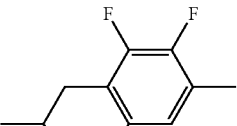 |
| dH | 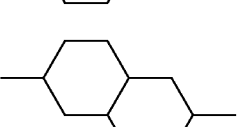 |
| K | 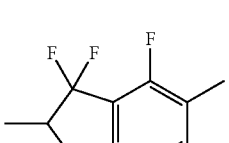 |
| L | 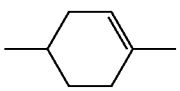 |
| F | 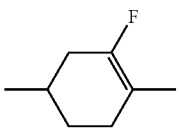 |
| NI | 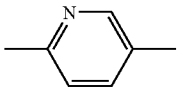 |

TABLE A-continued

Ring elements

N3fl 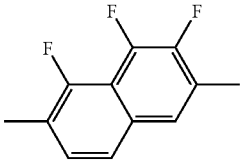

tHl 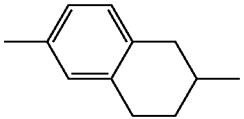

tH2fl 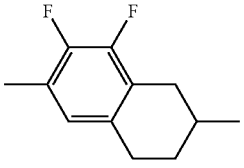

Kl 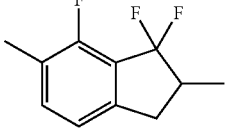

Ll 

Fl 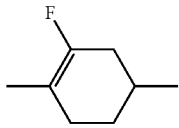

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| \multicolumn{4}{c}{Use alone} | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| \multicolumn{4}{c}{Use together with others} | | | |
| -...A...- | —C≡C— | -...A... | —C≡C— |
| -...V...- | CH=CH | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

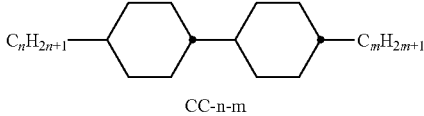

CC-n-m

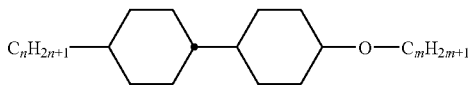

CC-n-Om

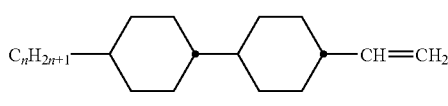

CC-n-V

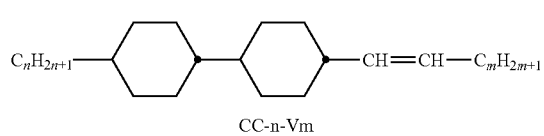

CC-n-Vm

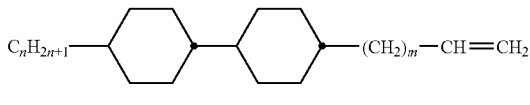

CC-n-mV

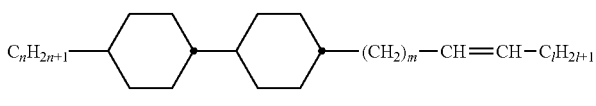

CC-n-mVl

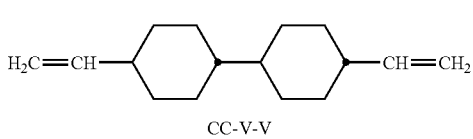

CC-V-V

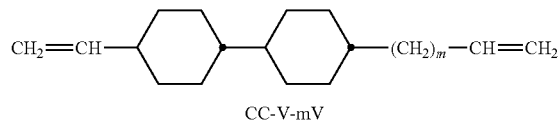

CC-V-mV

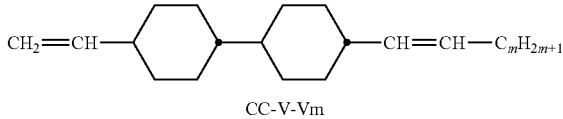

CC-V-Vm

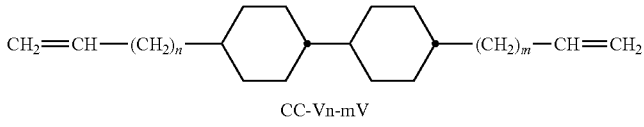

CC-Vn-mV

TABLE D-continued

Illustrative structures $C_nH_{2n+1}$—CH=CH—[Cy]—[Cy]—$(CH_2)_m$—CH=CH$_2$

CC-nV-mV $C_nH_{2n+1}$—CH=CH—[Cy]—[Cy]—CH=CH—$C_mH_{2m+1}$

CC-nV-Vm $C_nH_{2n+1}$—[Cy]—[Ph]—$C_mH_{2m+1}$

CP-n-m $C_nH_{2n+1}$O—[Cy]—[Ph]—$C_mH_{2m+1}$

CP-nO-m $C_nH_{2n+1}$—[Cy]—[Ph]—O$C_mH_{2m+1}$

CP-n-Om $C_nH_{2n+1}$—[Ph]—[Ph]—$C_mH_{2m+1}$

PP-n-m $C_nH_{2n+1}$O—[Ph]—[Ph]—$C_mH_{2m+1}$

PP-nO-m $C_nH_{2n+1}$—[Ph]—[Ph]—O$C_mH_{2m+1}$

PP-n-Om $C_nH_{2n+1}$—[Ph]—[Ph]—CH=CH$_2$

PP-n-V $C_nH_{2n+1}$—[Ph]—[Ph]—CH=CH—$C_mH_{2m+1}$

PP-n-Vm $C_nH_{2n+1}$—[Ph]—[Ph]—$(C_mH_{2m})$—CH=CH$_2$

PP-n-mV

TABLE D-continued

Illustrative structures $C_nH_{2n+1}$—⟨phenyl⟩—⟨phenyl⟩—$(CH_2)_m$—$CH=CH$—$C_lH_{2l+1}$ PP-n-mVI $C_nH_{2n+1}$—⟨cyclohexyl⟩—⟨cyclohexyl⟩—⟨phenyl⟩—$C_mH_{2m+1}$ CCP-n-m $C_nH_{2n+1}O$—⟨cyclohexyl⟩—⟨cyclohexyl⟩—⟨phenyl⟩—$C_mH_{2m+1}$ CCP-nO-m $C_nH_{2n+1}$—⟨cyclohexyl⟩—⟨cyclohexyl⟩—⟨phenyl⟩—$OC_mH_{2m+1}$ CCP-n-Om $C_nH_{2n+1}$—⟨cyclohexyl⟩—⟨cyclohexyl⟩—⟨phenyl⟩—$CH=CH_2$ CCP-n-V $C_nH_{2n+1}$—⟨cyclohexyl⟩—⟨cyclohexyl⟩—⟨phenyl⟩—$CH=CH$—$C_mH_{2m+1}$ CCP-n-Vm $C_nH_{2n+1}$—⟨cyclohexyl⟩—⟨cyclohexyl⟩—⟨phenyl⟩—$(C_mH_{2m})$—$CH=CH_2$ CCP-n-mV $C_nH_{2n+1}$—⟨cyclohexyl⟩—⟨cyclohexyl⟩—⟨phenyl⟩—$(C_mH_{2m})$—$CH=CH$—$C_lH_{2l+1}$ CCP-n-mVI $H_2C=CH$—⟨cyclohexyl⟩—⟨cyclohexyl⟩—⟨phenyl⟩—$C_mH_{2m+1}$ CCP-V-m $C_nH_{2n+1}$—$CH=CH$—⟨cyclohexyl⟩—⟨cyclohexyl⟩—⟨phenyl⟩—$C_mH_{2m+1}$ CCP-nV-m $CH_2=CH$—$(CH_2)_n$—⟨cyclohexyl⟩—⟨cyclohexyl⟩—⟨phenyl⟩—$C_mH_{2m+1}$ CCP-Vn-m

TABLE D-continued

Illustrative structures $C_nH_{2n+1}$—CH=CH—$(CH_2)_m$—⬡—⬡—⌬—$C_lH_{2l+1}$

CCP-nVm-l $C_nH_{2n+1}$—⬡—⌬—⌬—$C_mH_{2m+1}$

CPP-n-m $C_nH_{2n+1}$—⬡—⌬—⌬(F)—$C_mH_{2m+1}$

CPG-n-m $C_nH_{2n+1}$—⬡—⌬(F)—⌬—$C_mH_{2m+1}$

CGP-n-m $C_nH_{2n+1}O$—⬡—⌬—⌬—$C_mH_{2m+1}$

CPP-nO-m $C_nH_{2n+1}$—⬡—⌬—⌬—$OC_mH_{2m+1}$

CPP-n-Om $H_2C$=CH—⬡—⌬—⌬—$C_mH_{2m+1}$

CPP-V-m $C_nH_{2n+1}$—CH=CH—⬡—⌬—⌬—$C_mH_{2m+1}$

CPP-nV-m $CH_2$=CH—$(C_nH_{2n})$—⬡—⌬—⌬—$C_mH_{2m+1}$

CPP-Vn-m $C_nH_{2n+1}$—CH=CH—$(C_mH_{2m})$—⬡—⌬—⌬—$C_lH_{2l+1}$

CPP-nVm-l

TABLE D-continued
Illustrative structures
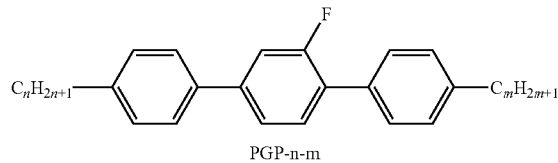
PGP-n-m
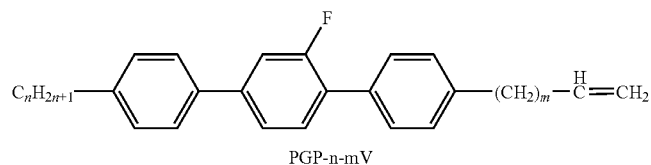
PGP-n-mV
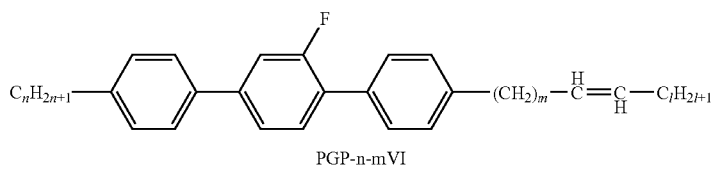
PGP-n-mVI
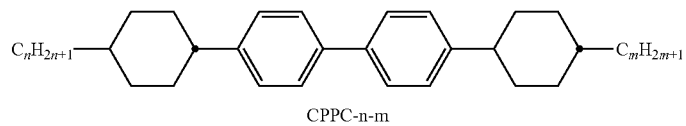
CPPC-n-m
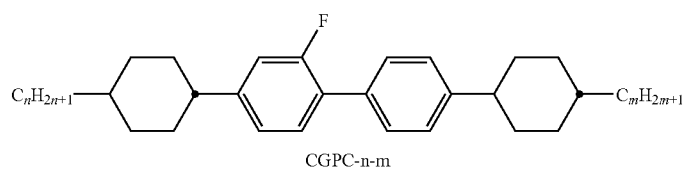
CGPC-n-m
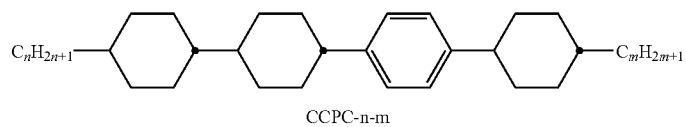
CCPC-n-m
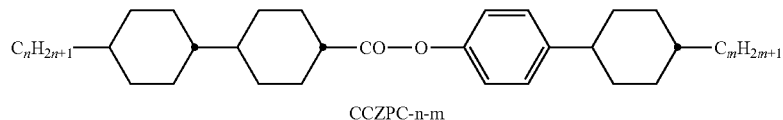
CCZPC-n-m
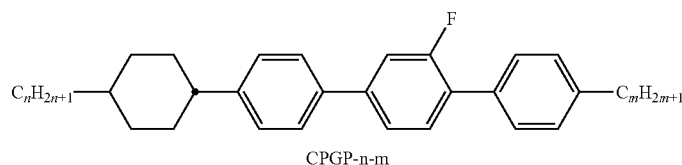
CPGP-n-m
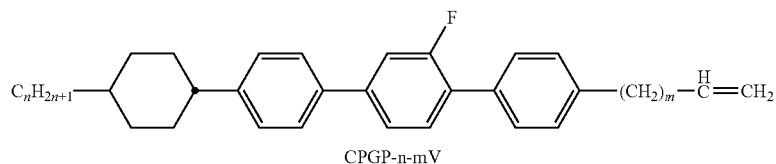
CPGP-n-mV TABLE D-continued
Illustrative structures
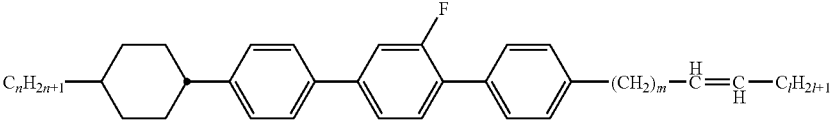
CPGP-n-mVI
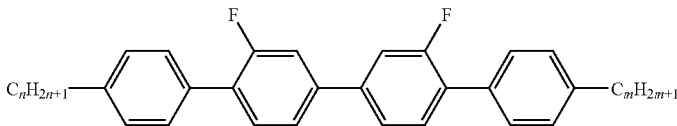
PGIGP-n-m
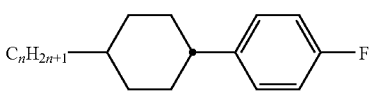
CP-n-F
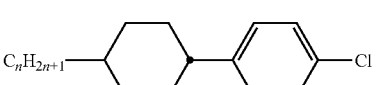
CP-n-CL
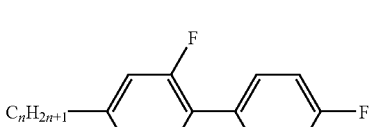
GP-n-F
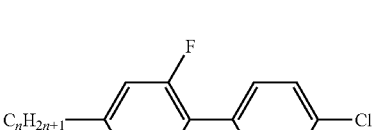
GP-n-CL
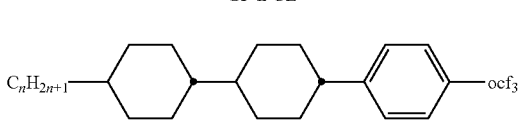
CCP-n-OT
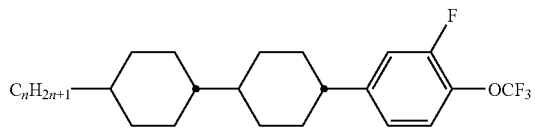
CCG-n-OT
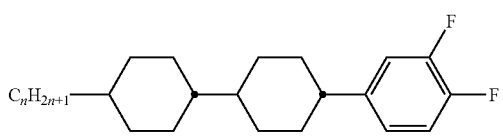
CCG-n-F TABLE D-continued
Illustrative structures
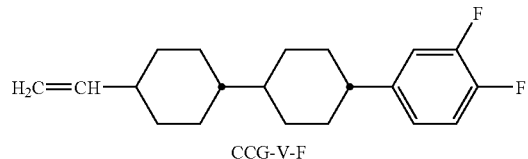
CCG-V-F
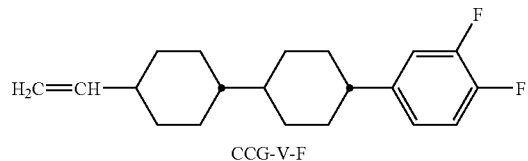
CCG-V-F
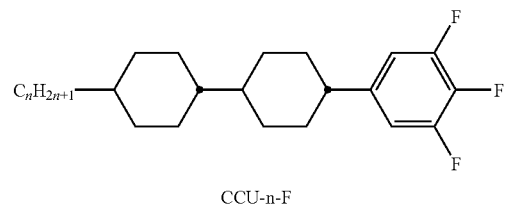
CCU-n-F
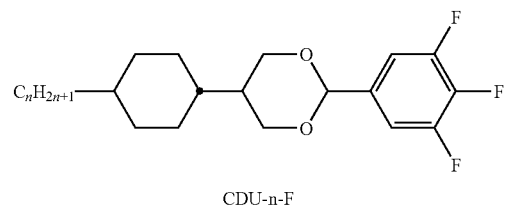
CDU-n-F
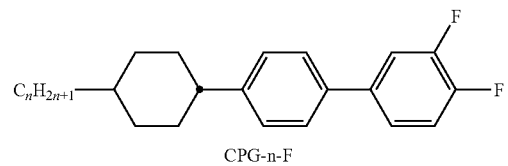
CPG-n-F
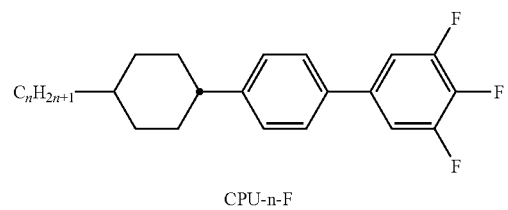
CPU-n-F
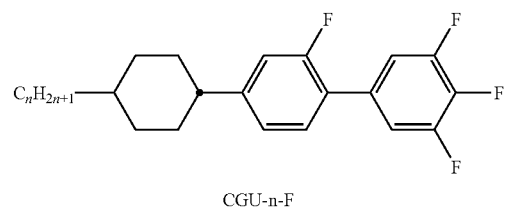
CGU-n-F TABLE D-continued
Illustrative structures
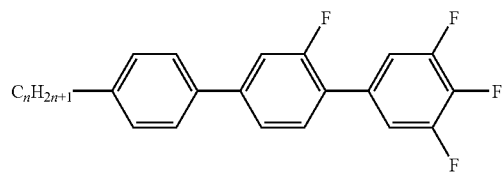
PGU-n-F
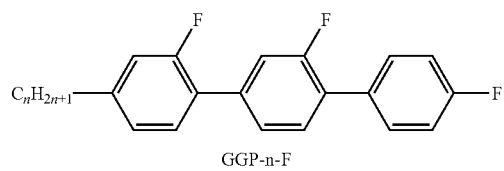
GGP-n-F
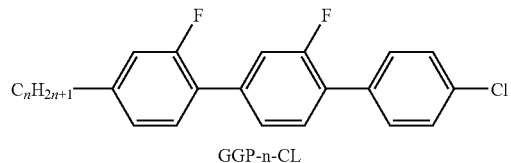
GGP-n-CL
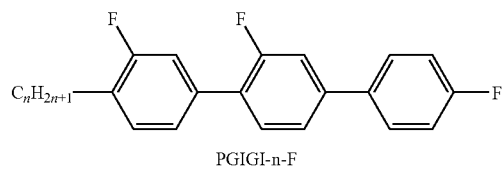
PGIGI-n-F
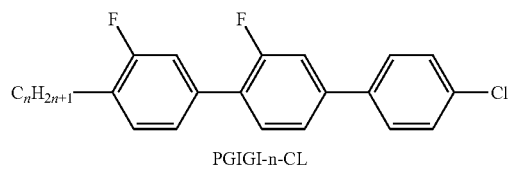
PGIGI-n-CL
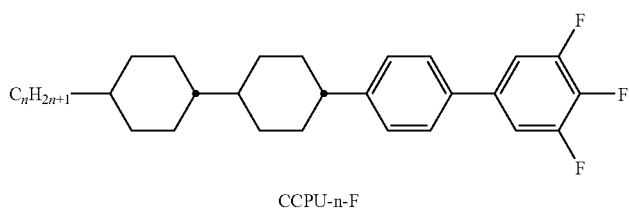
CCPU-n-F
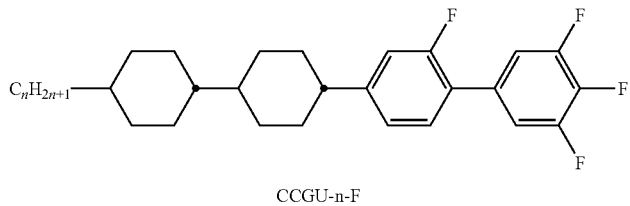
CCGU-n-F
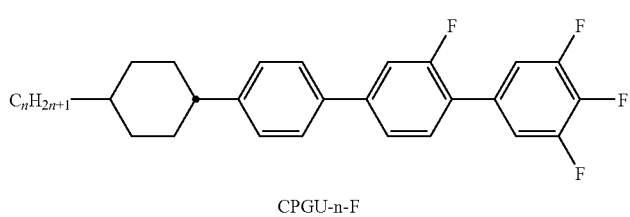
CPGU-n-F TABLE D-continued
Illustrative structures
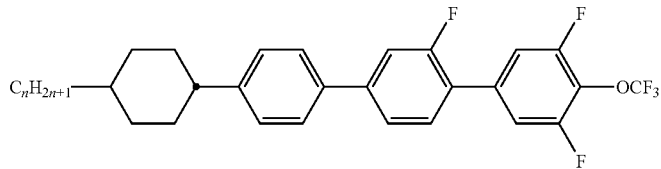
CPGU-n-OT
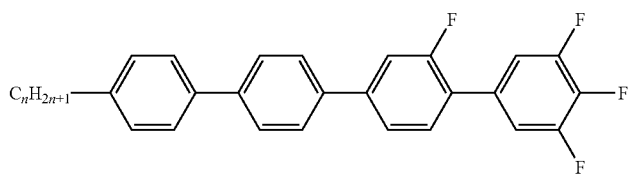
PPGU-n-F
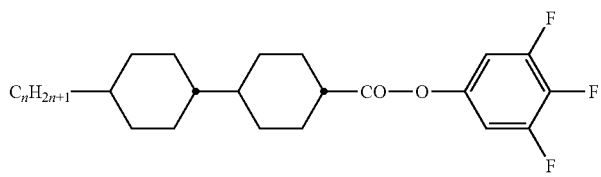
CCZU-n-F
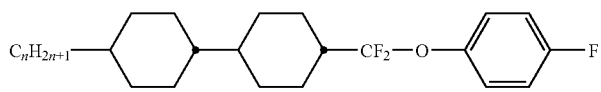
CCQP-n-F
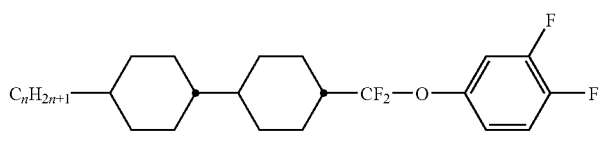
CCQG-n-F
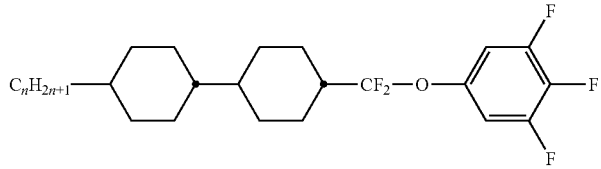
CCQU-n-F
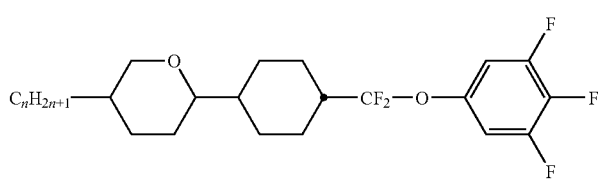
ACQU-n-F TABLE D-continued
Illustrative structures
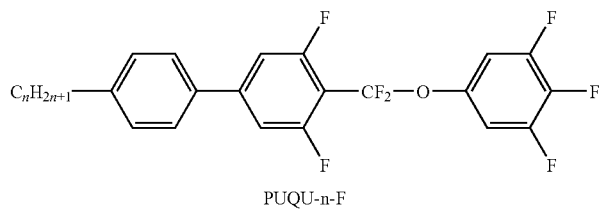
PUQU-n-F
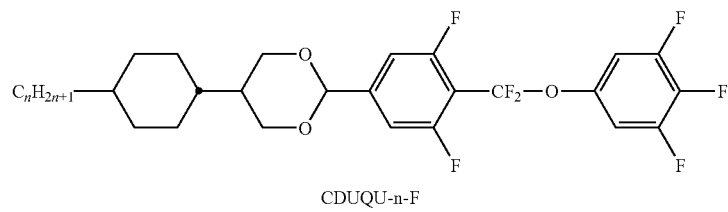
CDUQU-n-F
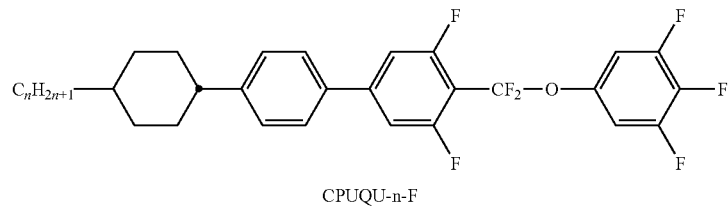
CPUQU-n-F
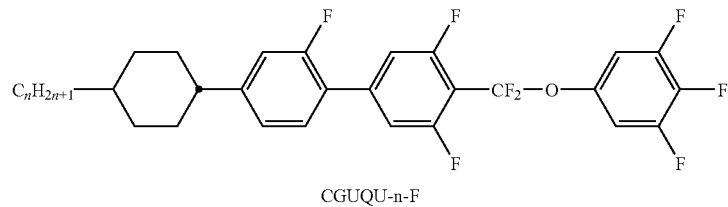
CGUQU-n-F
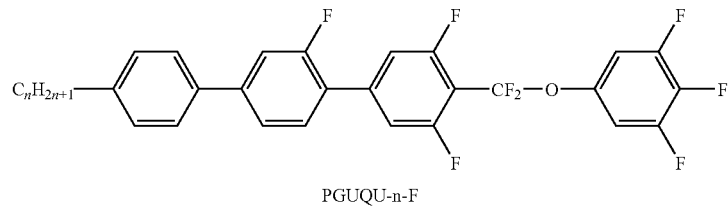
PGUQU-n-F
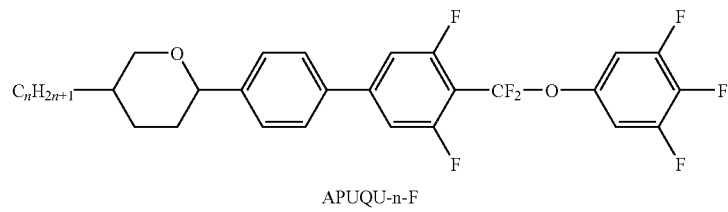
APUQU-n-F
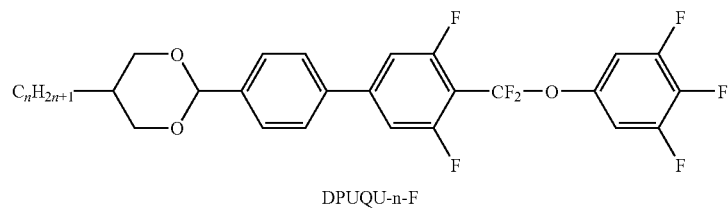
DPUQU-n-F

TABLE D-continued

Illustrative structures

DGUQGU-n-F

DGGQGG-n-OT

DGUQGU-n-OT

The following table, Table E, shows illustrative compounds which can be used as stabiliser in the mesogenic media in accordance with the present invention.

TABLE E

TABLE E-continued

TABLE E-continued
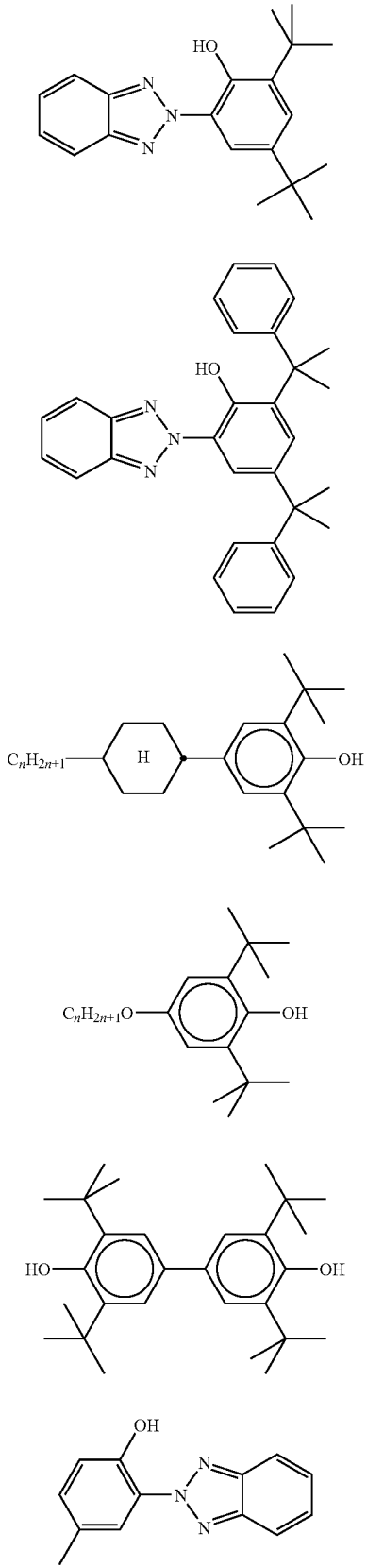
TABLE E-continued
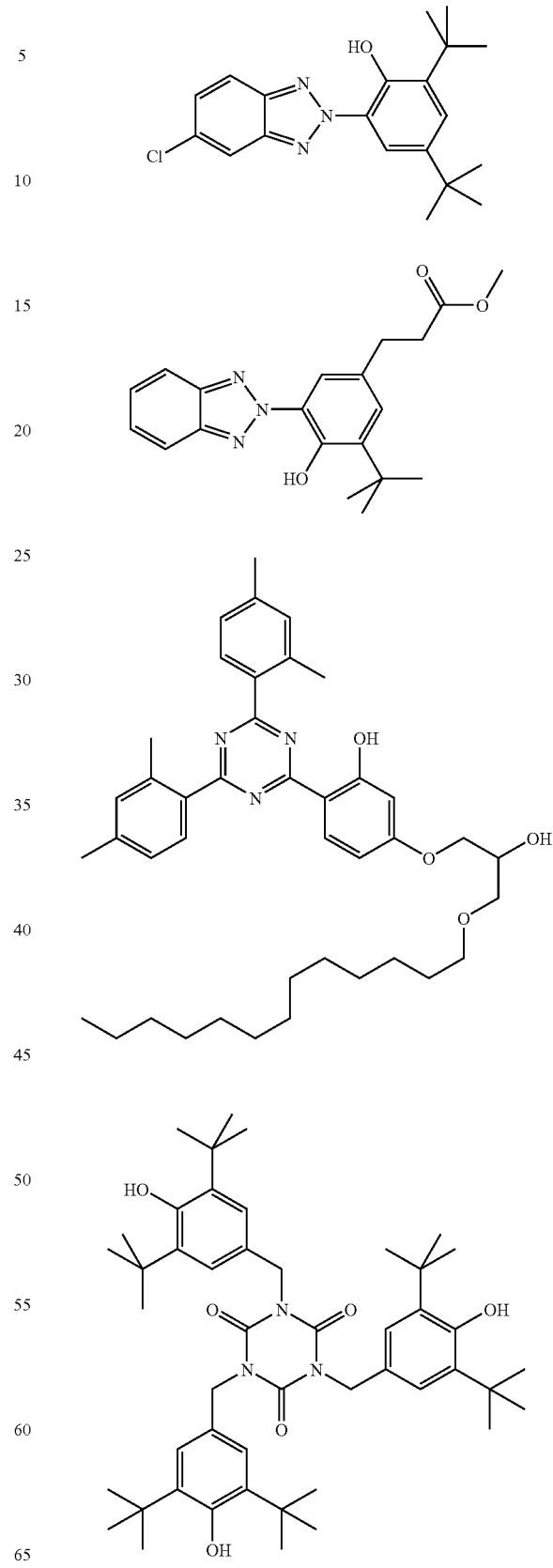

TABLE E-continued
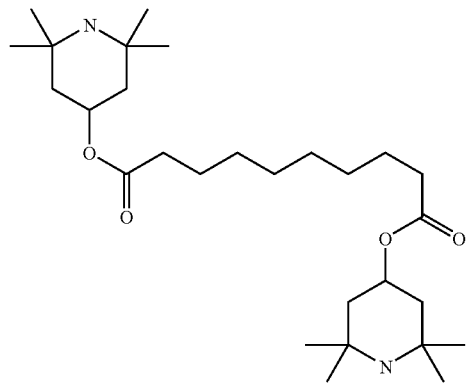
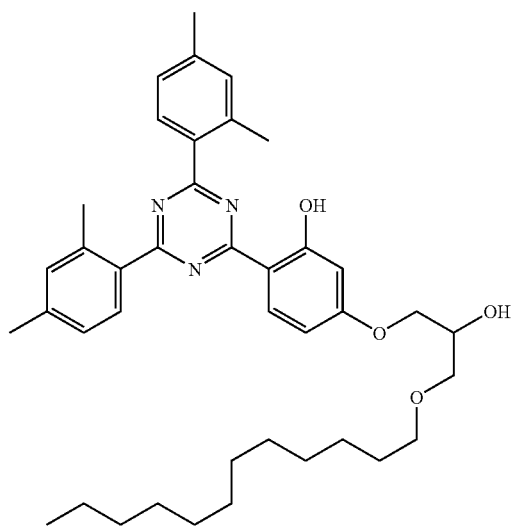
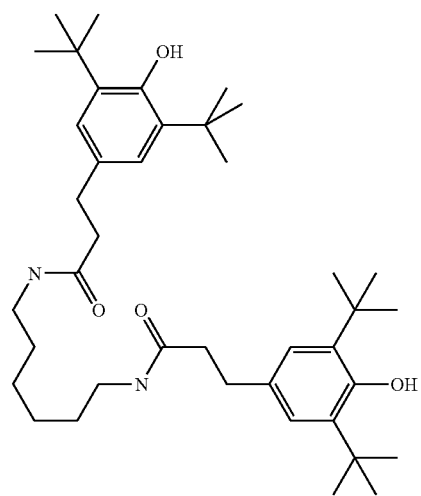
TABLE E-continued
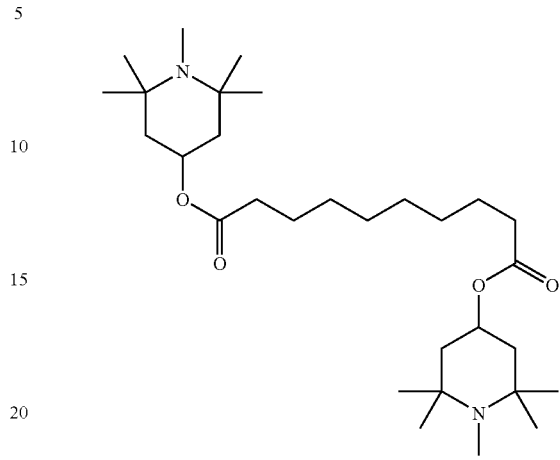
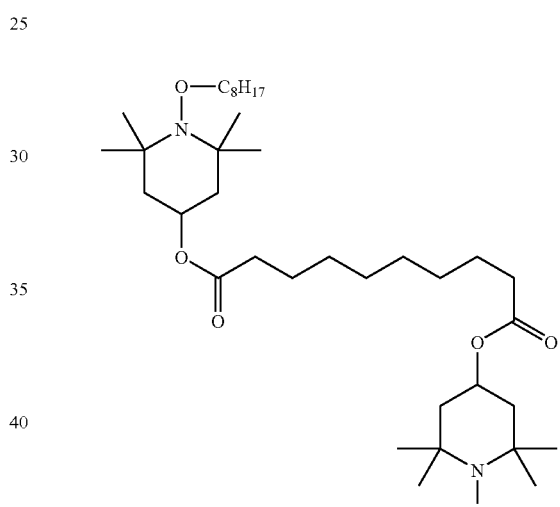
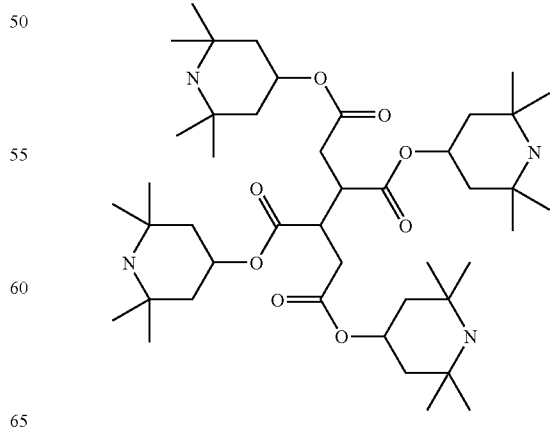

TABLE E-continued

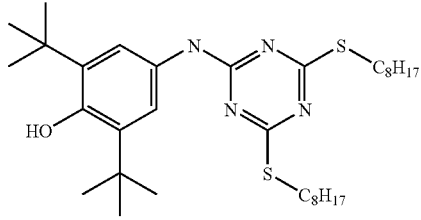

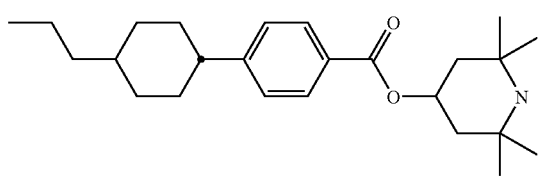

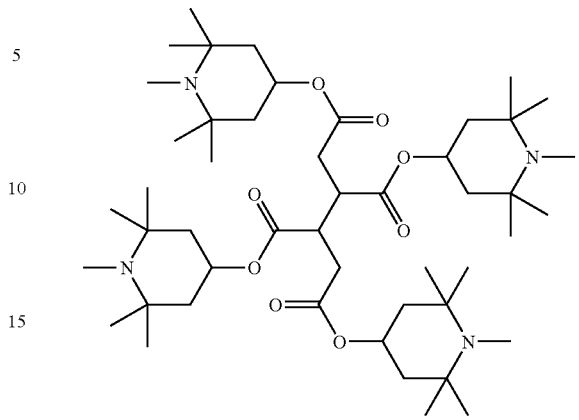

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F

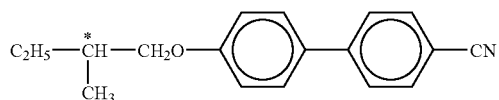

C 15

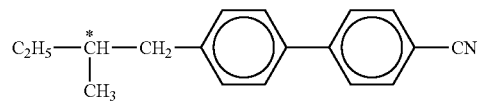

CB 15

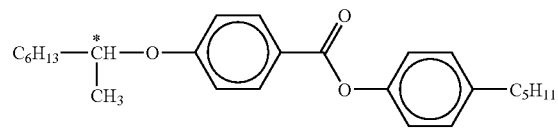

CM 21

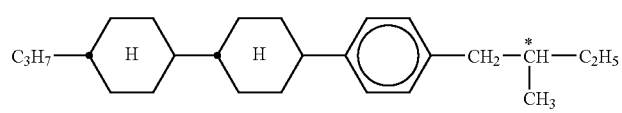

CM 44

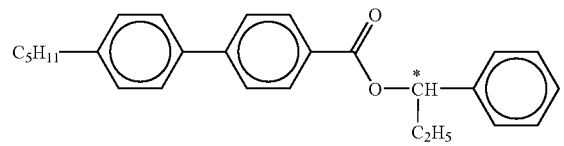

CM 45

TABLE F-continued
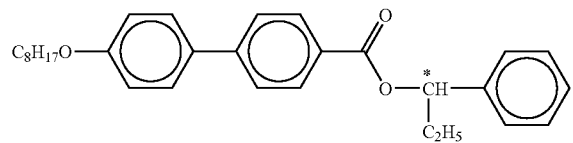
CM 47
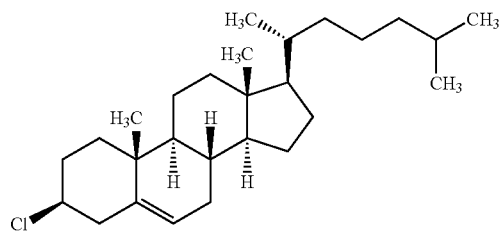
CC
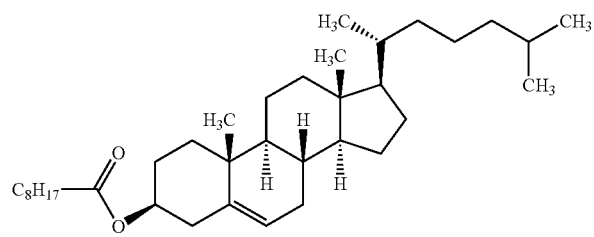
CN
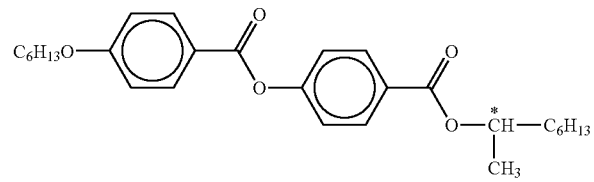
R/S-811
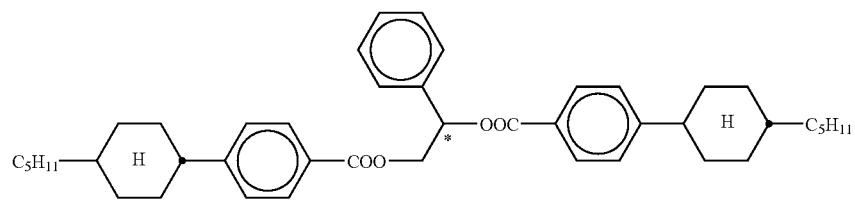
R/S-1011
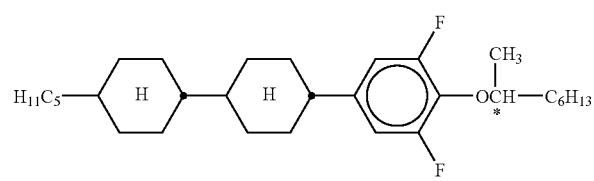
R/S-2011

TABLE F-continued

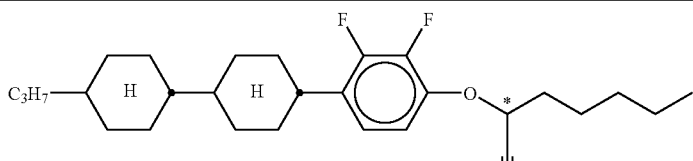

R/S-3011

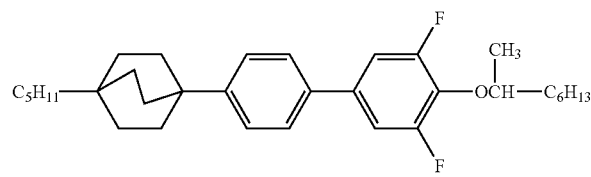

R/S-4011

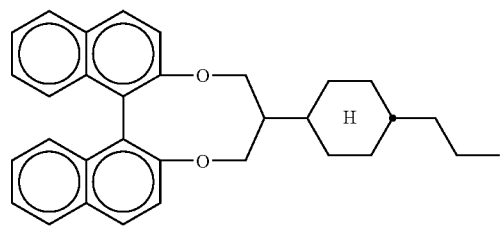

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise
seven or more, preferably eight or more, compounds, preferably compounds having three or more, preferably four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Example 1

A liquid-crystal mixture having the composition and properties as indicated in the following table is prepared.

| | Composition Compound | |
|---|---|---|
| No. | Abbreviation | |
| 1 | DGUQGU-5-F | 3.0 |
| 2 | APUQU-2-F | 6.0 |
| 3 | APUQU-3-F | 7.0 |
| 4 | PGUQU-3-F | 8.0 |
| 5 | ACQU-2-F | 7.0 |
| 6 | ACQU-3-F | 12.0 |
| 7 | PUQU-3-F | 12.0 |
| 8 | PGU-3-F | 7.0 |
| 9 | CCP-V-1 | 14.0 |
| 10 | CC-3-V | 24.0 |
| Σ | | 100.0 |

| Physical properties | |
|---|---|
| T(N, I) = | 74.0° C. |
| $\Delta n$ (20° C., 589.3 nm) = | 0.1125 |
| $\epsilon_{\|\|}$ (20° C., 1 kHz) = | 24.1 |
| $\Delta\epsilon$ (20° C., 1 kHz) = | 19.2 |
| $\gamma_1$ (20° C.) = | 110 mPa·s |
| $V_{10}$ (20° C.) = | 0.96 V |
| $V_{90}$ (20° C.) = | 1.48 V |

This mixture is very highly suitable for displays in TN mode and in particular for displays for use in notebooks (in particular with 2.5 V drivers).

Example 2

A liquid-crystal mixture having the composition and properties as indicated in the following table is prepared.

| | Composition Compound | |
|---|---|---|
| No. | Abbreviation | |
| 1 | DGUQGU-5-F | 6.0 |
| 2 | APUQU-2-F | 6.0 |

-continued

| | | |
|---|---|---|
| 3 | APUQU-3-F | 7.0 |
| 4 | PGUQU-3-F | 8.0 |
| 5 | ACQU-3-F | 11.0 |
| 6 | PUQU-3-F | 12.0 |
| 7 | PGU-3-F | 7.0 |
| 8 | CCP-V-1 | 12.0 |
| 9 | CC-3-V | 31.0 |
| Σ | | 100.0 |

Physical properties

| | |
|---|---|
| T(N, I) = | 75.0° C. |
| Δn (20° C., 589.3 nm) = | 0.1128 |
| $\epsilon_{\parallel}$ (20° C., 1 kHz) = | 22.7 |
| Δε (20° C., 1 kHz) = | 18.3 |
| $\gamma_1$ (20° C.) = | 110 mPa·s |
| $V_{10}$ (20° C.) = | 1.01 V |
| $V_{90}$ (20° C.) = | 1.55 V |

This mixture is very highly suitable for displays in TN mode and in particular for displays for use in notebooks (in particular with 2.5 V drivers).

Example 3

A liquid-crystal mixture having the composition and properties as indicated in the following table is prepared.

Composition Compound

| No. | Abbreviation | |
|---|---|---|
| 1 | DGUQGU-5-F | 8.0 |
| 2 | APUQU-3-F | 8.0 |
| 3 | ACQU-2-F | 8.0 |
| 4 | ACQU-3-F | 9.0 |
| 5 | PUQU-3-F | 12.0 |
| 6 | CCGU-3-F | 6.0 |
| 7 | CPGU-3-OT | 6.0 |
| 8 | CCP-V-1 | 9.0 |
| 9 | PGP-2-2V | 3.0 |
| 10 | CC-3-V | 24.0 |
| 11 | CC-3-V1 | 7.0 |
| Σ | | 100.0 |

Physical properties

| | |
|---|---|
| T(N, I) = | 90.0° C. |
| Δn (20° C., 589.3 nm) = | 0.109 |
| Δε (20° C., 1 kHz) = | 15.0 |
| $\gamma_1$ (20° C.) = | 126 mPa·s |
| $V_{10}$ (20° C.) = | 1.14 V |

This mixture is very highly suitable for displays in TN mode and in particular for displays with 3.3 V drivers).

Example 4

A liquid-crystal mixture having the composition and properties as indicated in the following table is prepared.

Composition Compound

| No. | Abbreviation | |
|---|---|---|
| 1 | DGUQGU-5-F | 8.0 |
| 2 | APUQU-3-F | 10.0 |
| 3 | PUQU-3-F | 10.0 |
| 4 | CCU-2-F | 10.0 |
| 5 | CCU-3-F | 9.0 |
| 6 | PGU-3-F | 4.0 |
| 7 | CCGU-3-F | 6.0 |
| 8 | CPGU-3-OT | 6.0 |
| 9 | CCP-V-1 | 9.0 |
| 10 | CC-3-V | 28.0 |
| Σ | | 100.0 |

Physical properties

| | |
|---|---|
| T(N, I) = | 90.0° C. |
| Δn (20° C., 589.3 nm) = | 0.109 |
| Δε (20° C., 1 kHz) = | 15.1 |
| $\gamma_1$ (20° C.) = | 122 mPa·s |
| $V_{10}$ (20° C.) = | 1.12 V |

This mixture is very highly suitable for displays in TN mode and in particular for displays with 3.3 V drivers.

Without further elaboration, it is believed that one skilled in the art can, using the preceding description, utilize the present invention to its fullest extent. The preceding preferred specific embodiments are, therefore, to be construed as merely illustrative, and not imitative of the remainder of the disclosure in any way whatsoever.

The entire disclosure[s] of all applications, patents and publications, cited herein and of corresponding German application No. DE 102009019604.8, filed Apr. 30, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystal medium, comprising the following components:

a first dielectrically positive component, component A, comprising one or more dielectrically positive compounds of formula I

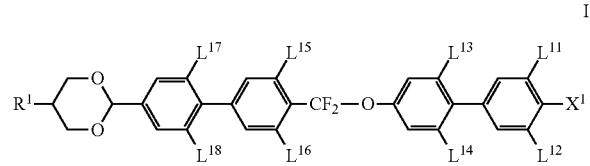

in which
$R^1$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,
$X^1$ denotes F, Cl, fluorinated alkyl or fluorinated alkoxy, each having 1 to 3 C atoms, or fluorinated alkenyl or fluorinated alkenyloxy having 2 to 3 C atoms, $L^{11}$ to $L^{18}$, independently of one another, denote H, F or Cl, and a second dielectrically positive component, component B, comprising one or more dielectrically positive compounds, one of which is a compound of formula II

II

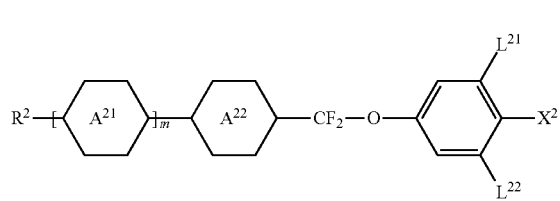

in which

R² denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

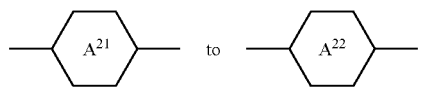

on each appearance, independently of one another, denote

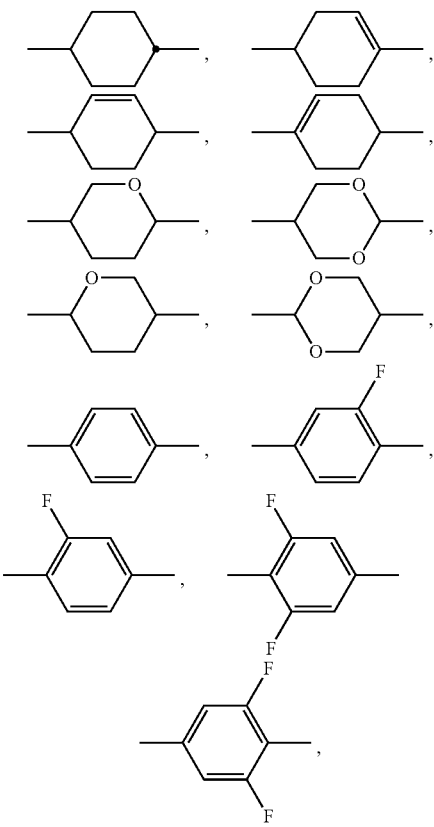

wherein at least one of

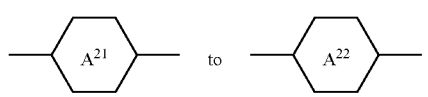 is

L²¹ and L²² independently of one another, denote H or F,

X² denotes halogen, halogenated alkyl or alkoxy having 1 to 3 C atoms or halogenated alkenyl or alkenyloxy having 2 or 3 C atoms, m denotes 0, 1, 2 or 3, and optionally a dielectrically neutral component, component C, comprising one or more dielectrically neutral compounds of formula IV

IV

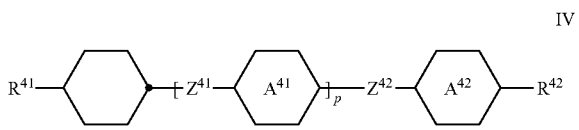

in which

R⁴¹ and R⁴², independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

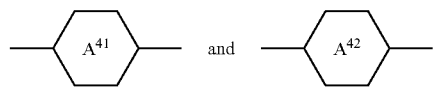

on each occurrence, independently of one another, denote

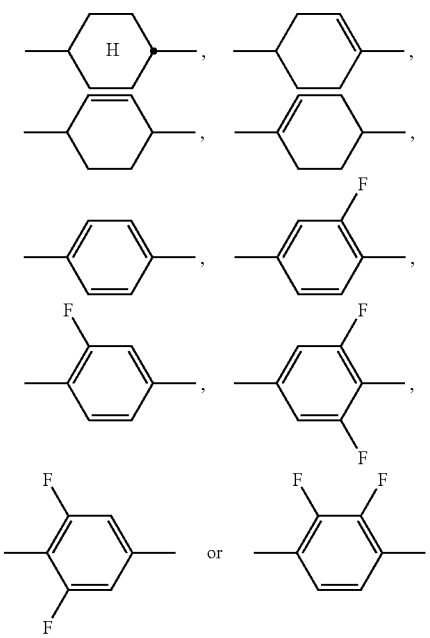

$Z^{41}$ and $Z^{42}$ on each occurrence, independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

2. A liquid-crystal medium according to claim 1, wherein component B, further comprises one or more dielectrically positive compounds of formula II' and/or III:

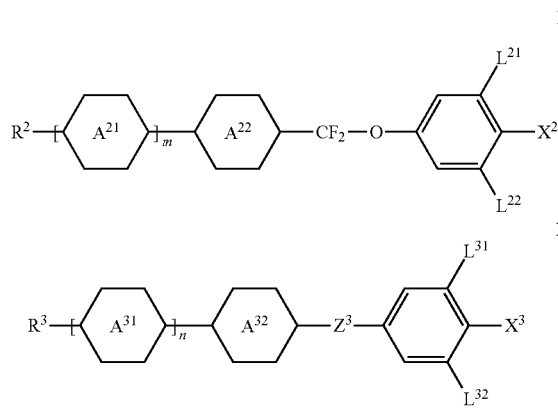

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

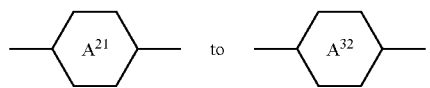

on each appearance, independently of one another, denote

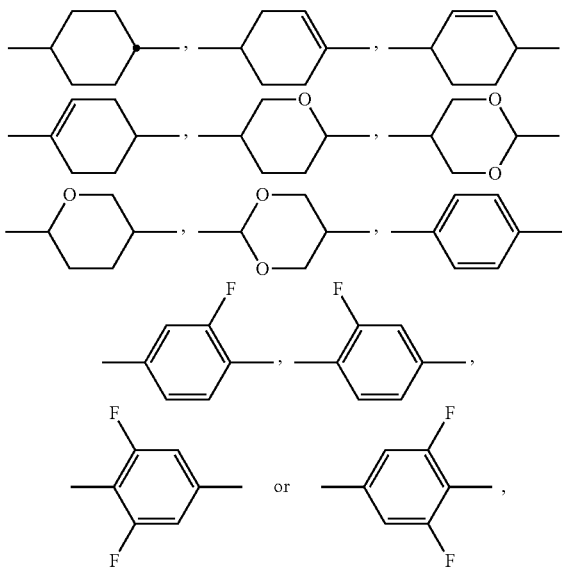

$L^{21}$, $L^{22}$, $L^{21}$ $L^{32}$, independently of one another, denote H or F, $X^2$ and $X^3$ independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and m and n independently of one another, denote 0, 1, 2 or 3.

3. A liquid-crystal medium according to claim 1, wherein the concentration of component A in the medium is 2% to 20%.

4. A liquid-crystal medium according to claim 2, which comprises one or more compounds of formula II'.

5. A liquid-crystal medium according to claim 2, which comprises one or more compounds of formula III.

6. A liquid-crystal medium according to claim 1, which comprises one or more dielectrically neutral compounds of formula IV.

7. A liquid-crystal medium according to claim 1, further comprising a dielectrically neutral component, component D, comprising one or more dielectrically neutral compounds of formula VI

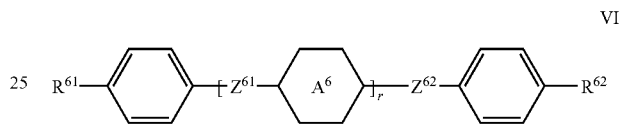

in which $R^{61}$ and $R^{62}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

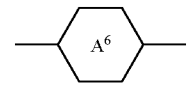

on each occurrence, independently of one another, denotes

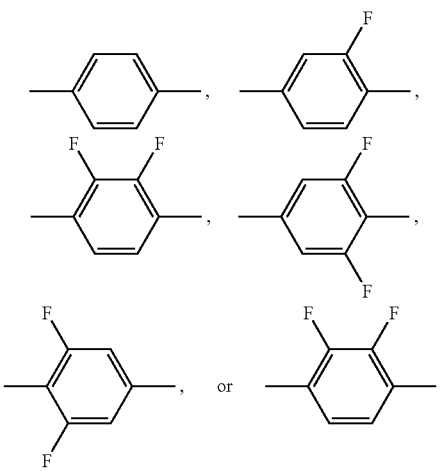

$Z^{61}$ and $Z^{62}$ on each occurrence, independently of one another, denote —CH$_2$CH$_2$—, —COO—, trans-CH=CH—, trans-CF=CF—, —CH$_2$O—, —CF$_2$O— or a single bond, and r denotes 0, 1 or 2.

8. A liquid-crystal display, containing a liquid-crystal medium according to claim 1.

9. A liquid-crystal display according to claim 8, which is addressed by an active matrix.

10. A process for preparing a liquid-crystal medium according to claim 2, comprising mixing one or more compounds of formula I with one or more compounds of formula II and optionally with one or more further compounds and/or additives and optionally with one or more compounds of formulae III and/or IV.

11. A liquid-crystal medium according to claim 1, having a treshold voltage of about 1 V.

* * * * *